US007734245B2

(12) United States Patent
Ravela et al.

(10) Patent No.: US 7,734,245 B2
(45) Date of Patent: Jun. 8, 2010

(54) STATISTICAL-DETERMINISTIC APPROACH TO NATURAL DISASTER PREDICTION

(75) Inventors: Sai Ravela, 39 Woodbury Rd., Southborough, MA (US) 01772; Kerry A. Emanuel, 9 Reed St., Lexington, MA (US) 02421

(73) Assignees: Sai Ravela, Southborough, MA (US); Kerry A. Emanuel, Lexington, MA (US)

( * ) Notice: Subject to any disclaimer, the term of this patent is extended or adjusted under 35 U.S.C. 154(b) by 927 days.

(21) Appl. No.: 11/388,185

(22) Filed: Mar. 23, 2006

(65) Prior Publication Data
US 2007/0168155 A1    Jul. 19, 2007

Related U.S. Application Data

(60) Provisional application No. 60/759,215, filed on Jan. 13, 2006.

(51) Int. Cl.
| | |
|---|---|
| *G01V 3/00* | (2006.01) |
| *G01V 7/00* | (2006.01) |
| *G06G 7/48* | (2006.01) |
| *G09B 9/56* | (2006.01) |
| *G01S 13/00* | (2006.01) |

(52) U.S. Cl. ............... 434/8; 702/2; 702/3; 702/4; 702/15; 703/2; 703/5; 706/930; 706/931; 342/26 A

(58) Field of Classification Search ............... 434/8; 703/2, 5; 702/2, 3, 4, 15; 342/26; 706/930, 706/931
See application file for complete search history.

(56) References Cited

U.S. PATENT DOCUMENTS 4,402,672 A * 9/1983 Lowe, Jr. ............... 434/217
5,717,589 A * 2/1998 Thompson et al. ......... 702/3

(Continued)

FOREIGN PATENT DOCUMENTS

WO    WO 2005/088496 A2    9/2005

(Continued)

OTHER PUBLICATIONS

Murnane et al. "Model Estimates Hurricane Wind Speed Probabilities"), EOS, Transactions, American Geophysical Union, vol. 91, No. 38, Sep. 2000, pp. 433-438.*

(Continued)

*Primary Examiner*—Kamini S Shah
*Assistant Examiner*—Shambhavi Patel
(74) *Attorney, Agent, or Firm*—Occhiuti Rohlicek & Tsao LLP

(57) ABSTRACT

A combined statistical-deterministic approach to methods and systems for assessing risk associated with natural disasters, in particular, hurricane wind risk. One example of a method of predicting wind speed distribution within a predetermined distance from a point of interest includes steps of statistically synthesizing a large plurality of wind storm tracks that pass within a predetermined radius of the point of interest, running a deterministic simulation of wind intensity along each one of the large plurality of wind storm tracks to produce an output representative of wind speed distribution along each track, and using the output to estimate an overall wind speed probability distribution from a combination of the wind speed distributions along each track within the predetermined distance from the point of interest.

18 Claims, 14 Drawing Sheets

U.S. PATENT DOCUMENTS

| | | | |
|---|---|---|---|
| 5,839,113 A | 11/1998 | Federau et al. | |
| 6,049,773 A | 4/2000 | McCormack | |
| 6,125,328 A * | 9/2000 | Baron et al. | 702/3 |
| 6,169,476 B1 | 1/2001 | Flanagan | |
| 6,188,960 B1 * | 2/2001 | Baron et al. | 702/3 |
| 6,266,063 B1 * | 7/2001 | Baron et al. | 345/419 |
| 6,278,947 B1 * | 8/2001 | Baron et al. | 702/3 |
| 6,401,039 B1 * | 6/2002 | Baron et al. | 702/3 |
| 6,493,633 B2 | 12/2002 | Baron | |
| 6,581,009 B1 * | 6/2003 | Smith | 702/3 |
| 6,603,405 B2 | 8/2003 | Smith | |
| 6,670,908 B2 * | 12/2003 | Wilson et al. | 342/26 R |
| 6,683,609 B1 * | 1/2004 | Baron, Sr. et al. | 345/419 |
| 6,691,035 B1 * | 2/2004 | Kang | 702/3 |
| 6,753,784 B1 | 6/2004 | Sznaider | |
| 6,829,536 B2 * | 12/2004 | Moore | 702/3 |
| 6,836,730 B2 | 12/2004 | Root et al. | |
| 6,845,324 B2 | 1/2005 | Smith | |
| 7,043,368 B1 * | 5/2006 | Cote et al. | 702/3 |
| 2004/0093161 A1 * | 5/2004 | Inubushi | 702/2 |

FOREIGN PATENT DOCUMENTS

WO   WO 2005/088556 A2   9/2005

OTHER PUBLICATIONS

Powell et al. "State of Florida Hurricane Lose Projection Model: Atmospheric Science Component", 2003.*

Powell "State of Florida Hurricane Lose Projection Model: Atmospheric Science Component", 2005.*

DeMaria t al. "A Statistical Hurricane Intensity Prediction Scheme (SHIPS) for the Atlantic Basin", Hurricane Research Devision, Jun. 1994.*

Camp et al. "Hurricane Maximum Intensity: Past and Present", Monthly Weather Review, vol. 129, Sep. 2000.*

Gurley et al. "Analysis and Simulation Tools for Wind Engineering", Jan. 1998.*

Chen et al. "A Reliable Web-based System for Hurrican Analysis and Simulation", IEEE Internation Conference on Systems, Man, and Cybermetics, 2004.*

Elsner et al. "A Hierarchical Bayesian Approach to Seasonal Hurricane Modeling", American Meteorological Society, 2004.*

Pinelli et al. "Hurricane Damage Prediction Model for Residential Structures", Journal of Structural Engineering, Nov. 2004.*

Elsner et al. "A Hierarchical Bayesian Approach to Seasonal Hurricane Modeling" American Meteorological Society (2004).

Huang et al. "Hurricane Simulation Techniques for the Evaluation of Wind-Speeds and Expected Insurance Losses" Journal of Wind Engineering and Industrial Aerodynamics 89 (2001) 605-617.

Jagger et al. "A Dynamic Probability Model of Hurricane Winds in Coastal Counties of the United States" Journal of Applied Meteorology, vol. 40, May 2001.

Georgiou et al., "Georgiou, P. N., A. G. Davenport and P. J. Vickery, 1983: Design wind speeds in regions dominated by tropical cyclones" J. Wind Eng. Ind. Aerodyn., 13, 139-152).

Chu et al., 1998: Modeling return periods of tropical cyclone intensities in the vicinity of Hawaii. J. Appl. Meteor., 37, 951-960.

Darling, 1991: Estimating probabilities of hurricane wind speeds using a large-scale empirical model. J. Climate, 4, 1035-1056.

Vickery et al., 2000: Simulation of hurricane risk in the U.S. using empirical track model. J. Struct. Eng., 126, 1222-1237.

Emanuel, K. et al., 2004: Environmental control of tropical cyclone intensity. J. Atmos. Sci., 61, 843-858.

* cited by examiner

FIG. 1C
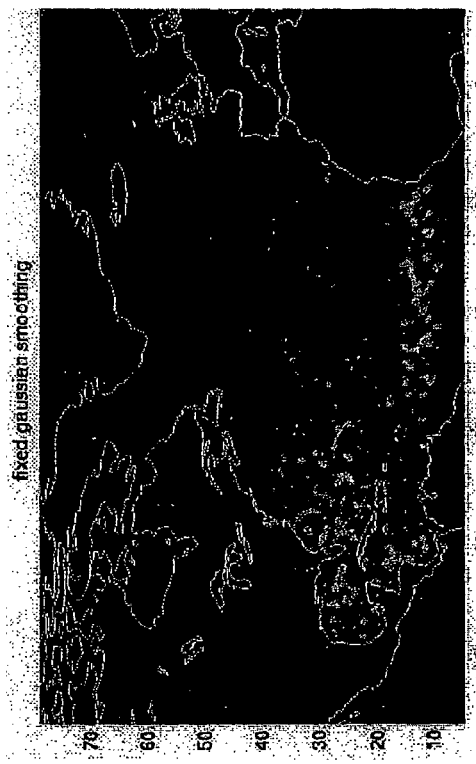
FIG. 1B
FIG. 1A

Probability of speed and direction given previous speed and direction

FIG. 4

| Space →<br>Time | 0.5° x0.5°<br>discretization | 5° x5°<br>discretization | Three manually<br>constructed<br>latitude belts | Global |
|---|---|---|---|---|
| 9 time<br>periods | Priority: 1 | 2 | 3 | 7 |
| 1 time<br>period<br>(annual) | 4 | 5 | 6 | 8 |

STATISTICAL-DETERMINISTIC APPROACH TO NATURAL DISASTER PREDICTION

CROSS-REFERENCE TO RELATED APPLICATIONS

This application claims the benefit under 35 U.S.C. §119(e) of the filing date of U.S. Application No. 60/759,215 to Ravela et al. filed Jan. 13, 2006 and entitled "A STATISTICAL-DETERMINISTIC APPROACH TO NATURAL DISASTER PREDICTION," which is herein incorporated by reference.

BACKGROUND

1. Field of the Invention

The present invention relates generally to risk assessment, and more specifically to the assessment of risk associated with events of nature.

2. Discussion of the Related Art

Tropical cyclones, also referred to as hurricanes, are among the most dangerous and costly natural disaster affecting mankind. The Galveston hurricane of 1900 was the deadliest natural catastrophe in U.S. history, and in 1998, hurricane Mitch killed over 11,000 people in central America. Although loss of life in more developed countries has been greatly reduced by successful warning programs and evacuation strategies, property losses are rapidly increasing due to continuing construction and economic growth in hurricane-prone areas, such as the coast of the Gulf of Mexico and southern Florida. For example, hurricane Andrew which struck the U.S. in 1992 caused over $32 billion of property damage and recent hurricanes Ivan and Katrina have caused substantial loss of life along with billions of dollars worth of damage.

Much of the property damage and loss of life associated with hurricanes results from high winds speeds and wind-induced storm surges, such as the storm surge associated with hurricane Katrina that caused severe flooding of New Orleans. Consequently, there have been several efforts to monitor and track storms, and to assess risks associated with storm winds.

Current techniques for estimating the probability that a hurricane will strike a given location are based on historical compilations of hurricane tracks and intensities. An example of such historical compilations includes the so-called "best track" data compilations maintained by forecasting operations such as the National Oceanic and Atmospheric Administration's Tropical Prediction Center (TPC) and the U.S. Navy's Joint Typhoon Warning Center (JTWC). These records generally contain information about the position (e.g., latitude and longitude) of the storm center measured every six hours, together with a single intensity estimate (e.g., maximum wind speed or central pressure) for each six hour time period. For example, such data can be used to assess regional risk by dividing a large area into a grid and assigning each cell a "risk factor" based on the frequency of event in that cell as derived from the collected historical data. Such methods are described, for example, in U.S. Pat. No. 5,839,113 to Federau et al. and in International Publications WO 2005/088556 and WO 2005/088496 to Risk Management Solutions, Inc.

One example of a conventional technique for assessing risk of wind speed at a given location is described in a paper by Georgiou et al (Georgiou, P. N., A. G. Davenport and P. J. Vickery, 1983: Design wind speeds in regions dominated by tropical cyclones. *J. Wind Eng. Ind. Aerodyn.*, 13, 139-152). Georgiou's technique involves fitting standard distribution functions, such as log-normal and/or Weibull distributions, to the distribution of maximum intensities of all historical storms coming within a specified radius of the point of interest. Then, drawing randomly from such distributions, Georgiou uses standard models of the radial structure of storms, together with recorded translation speed and landfall information, to estimate the maximum wind likely to be achieved at the point of interest.

Other examples of conventional risk assessment techniques include those described in papers by Chu and Wang (Chu, P. S. and J. Wang, 1998: Modeling return periods of tropical cyclone intensities in the vicinity of Hawaii. *J. Appl. Meteor.*, 37, 951-960) and Darling (Darling, R. W. R., 1991: Estimating probabilities of hurricane wind speeds using a large-scale empirical model. *J. Climate*, 4, 1035-1056). These techniques use empirical global distributions of relative intensity (which is the ratio of actual to potential intensity, the latter being a measure of the thermodynamic potential for hurricanes) together with climatology of potential intensity to infer local intensity distributions. Potential intensity is defined as the maximum wind speed theoretically attainable in tropical cyclones given large-scale thermodynamic conditions and is easily calculable from large-scale observed or modeled atmospheric fields. A similar approach is described in a paper by Murnane et al. in which global estimates of actual (rather than relative) hurricane wind intensity cumulative probability distributions are used to infer local intensities (Murnane, R. J., C. Barton, E. Collins, J. Donnelly, J. B. Elsner, K. Emanuel, I. Ginis, S. Howard, C. W. Landsea, K. B. Liu, M. Malmquist, M. McKay, A. Michaels, N. B. Nelson, J. O'Brien, D. Scott and T. Webb, 2000: Model estimates of hurricane wind speed probabilities. *Eos*, 81, 433-438).

Another approach is described in a paper by Vickery et. al (Vickery, P. J., P. F. Skerjl and L. A. Twisdale, 2000: Simulation of hurricane risk in the U.S. using empirical track model. *J. Struct. Eng.*, 126, 1222-1237). Vickery uses statistical properties of both historical tracks and historical intensities to generate a large number of synthetic storms in the North Atlantic basin. Vickery then models six hour changes in direction, translation speed and intensity along each track as linear functions of previous values of those quantities as well as of position and sea surface temperature. Thus, Vickery generates a large database of synthetic storm tracks using previous track history and local climatology, and couples to these tracks historical intensity data.

SUMMARY OF THE INVENTION

Conventional methods for predicting risk of hurricanes such as those described above rely directly on historical hurricane track data to estimate the frequency of storms passing close to points of interest, and assume that intensity evolution of the storm is independent of the particular track taken by the storm. A significant disadvantage of such techniques is the paucity of real data for high intensity events which makes accurate estimations or predictions of these events difficult. This lack of real data has motivated modeling of events using assumed parametric distributions for which there is very little supporting data. However, as a result, estimates of the frequency of high intensity events using such conventional techniques are very sensitive to error between reality and the model used. Moreover, the relative intensity method must fail when storms move into regions of small or vanishing potential intensity, as they often do in the western North Atlantic. Return period estimation is particularly problematic in places like New England, which have experienced infrequent but devastating storms, and for which the historical record is sparse and the local potential intensity is zero.

There is a need for a system and method of assessing long-term risk associated with natural disasters that is accurate and able to function in areas where the frequency of natural disasters is low, but potential loss is great. Thus, aspects and embodiments of the invention are directed to systems and methods for assessing the long-term risk associated with natural disasters, that is, the probability over a long period of time (e.g., five to ten years or longer) that a natural disaster will affect a point of interest. In one example, it may also be desirable for embodiments of the invention to be able to account for the effects of global and regional climate change.

In summary, to assess the probability that an event will pass close enough to a point of interest to affect it, two independent methods of generating large numbers of synthetic event tracks may be applied. By generating large numbers of synthetic tracks passing through an area, the tracks having properties that statistically conform to observed data, event risk may be assessed in areas that have very few recorded events, and where conventional methods may be inaccurate due to the lack of observed data. In one embodiment, a first technique models each track as a Markov chain, using statistics derived from observed hurricane track data or predicted data generated by a climatologic model. A second technique that may be used to generate synthetic event tracks may model the tracks using time-varying synthetic fields represented by mathematical constructions. It is to be appreciated that such a technique may be particularly useful for generating and modeling wind storm tracks.

In one example, the method begins by generating a large class of synthetic time varying wind fields at upper and lower atmospheric levels. These wind fields may be modeled to resemble observed wind fields by matching their statistical properties to those of observed wind fields. For example, the variance, covariance and monthly mean flow data for these wind fields may be constrained to match observed or globally modeled data, and their kinetic energy may be constrained to follow observed spectral frequency distributions for geostrophic turbulence. In one example, wind storms may be assumed to move with a weighted mean of the upper and lower atmospheric flow plus a "beta drift" correction that may account for the effect of variable Coriolis force.

In one embodiment, for a given location of interest, many synthetic tracks may be generated that pass within a specified distance of the location of interest, using one or both of the track generation methods. For each of these tracks, a deterministic numerical simulation of the event's intensity may be carried out, using statistics derived from observed data. In one example in which the tracks may be wind storm tracks, wind storms may be modeled as synthetic time varying wind fields and wind shear information may be derived from such synthetic wind time series and used in the intensity simulation, as discussed below. For wind storms, the track and intensity data may be used together with a vortex structure model to construct probability distributions of wind speed at fixed points in space.

According to one embodiment, a method of predicting wind speed distribution within a predetermined distance from a point of interest may comprise steps of statistically synthesizing a large plurality of wind storm tracks that pass within a predetermined radius of the point of interest, running a deterministic simulation of wind intensity along each one of the large plurality of wind storm tracks to produce an output representative of wind speed distribution along each track, and using the output to estimate an overall wind speed distribution from a combination of the wind speed distributions along each track within the predetermined distance from the point of interest.

In one example, the step of synthesizing the large plurality of wind storm tracks includes originating the large plurality of storm tracks by randomly selecting a corresponding large plurality of genesis points from a space-time probability density function of genesis locations based on at least one of historical wind storm data and simulated wind storm data. It is to be appreciated that the term "genesis points" as used herein may refer to a location in space and/or time where an event track (e.g., a wind storm track) may originate, or may be initialized or reinitialized, as discussed below. The step of originating may further includes constructing a space-time grid over an area of interest, and counting a number of wind storms originating within each cell of the space-time grid based on at least one of the historical wind storm data and the simulated wind storm data to provide estimated distribution of genesis points for the large plurality of wind storm tracks within the area of interest. In addition, the step of originating may further include smoothing the estimated distribution of genesis points to reduce errors that may occur due to discretization. For example, smoothing may be accomplished using a spatio-temporally decaying window function to create the space-time probability density function of genesis locations. In another example, the step of statistically synthesizing the large plurality of wind storm tracks may further include generating each of the large plurality of wind storm tracks using a Markov chain constructed with statistical features of historical or simulated wind storm tracks. In one example, such a Markov chain may be parameterized in terms of speed, direction and their rates of change.

In another example, the step of statistically synthesizing the large plurality of wind storm tracks may include synthesizing a time series of wind at at least two pressure levels including a first pressure level and a second pressure level, and modeling wind storm motion as a weighted average of air flow at the at least two pressure levels plus a beta drift correction. Synthesizing the time series may include modeling the time series of wind as a Fourier series constrained to have monthly mean and variance that match historical statistical data.

In yet another example, the step of running a deterministic simulation of wind intensity along each one of the large plurality of wind storm track may include modeling the wind storm intensity using a model phrased in angular momentum coordinates and also using environmental wind shear.

Another embodiment is directed to a computer readable medium encoded with a plurality for instructions adapted to be executed on at least one processor to perform the above-described method. Another embodiment is directed to a data set comprising a probabilistic wind speed distribution within the predetermined radius of the point of interest, the data set being generated according to the above-described method(s).

According to another embodiment, a method of generating a data set corresponding to a probabilistic wind speed distribution within a predetermined radius of a point of interest comprises statistically generating a large plurality of synthetic wind storm tracks that pass within the predetermined radius of the point of interest, modeling an intensity of a synthetic wind storm at a plurality of points along each one of the large plurality of synthetic wind storm tracks, based on the intensity modeling step, generating, for each one of the large plurality of synthetic wind storm tracks, a probabilistic wind speed distribution at selected points along the synthetic wind storm track, and producing the data set by combining the probabilistic wind speed distributions for each of the large plurality of synthetic wind storm tracks within the predetermined radius of the point of interest.

A further embodiment is directed to a method of estimating long-term risk associated with wind speed within an area of interest comprising modeling an intensity of a synthetic wind storm at a plurality of points along each one of a large plurality of statistically generated synthetic wind storm tracks to produce an estimate of wind speed distribution along each track, generating a probabilistically weighted combination of the estimated wind speed distributions along each track to create a probabilistic wind speed distribution within the are of interest, and estimating a risk of wind speed within the are of interest exceeding a predetermined threshold value based on the probabilistic wind speed distribution.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A is an illustration of a raw histogram of hurricane genesis locations in the Atlantic ocean;

FIG. 1B is an illustration of the histogram of FIG. 1A smoothed by a fixed Gaussian windowing function;

FIG. 1C is an illustration of the histogram of FIG. 1A smoothed by a variable Gaussian windowing function;

FIG. 4 is one example of a priority schedule for collecting event data according to one embodiment of the invention;

FIG. 15 is a graph illustrating maximum sustained winds as a function of hurricane translation speed using several ocean-atmospheric models.

DETAILED DESCRIPTION OF EMBODIMENTS OF THE INVENTION

Figure 2:
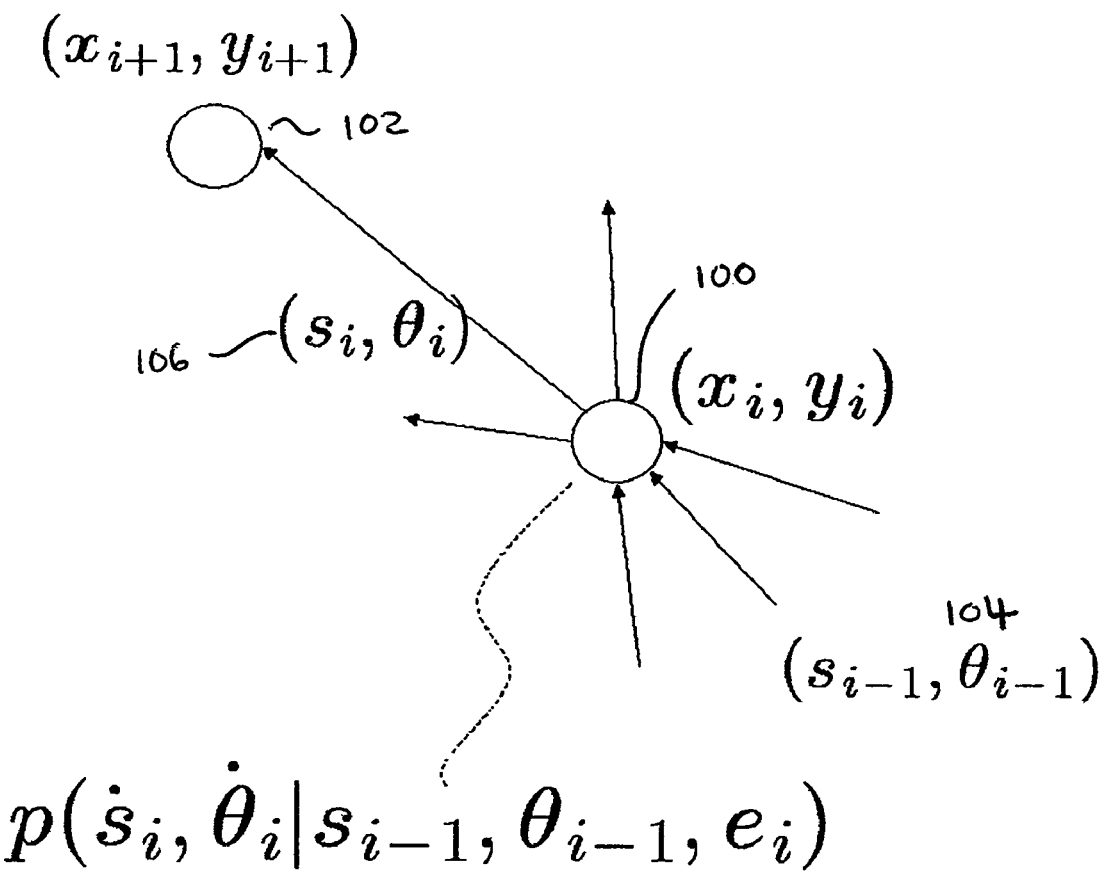
FIG. 2 is a diagram of an example relationship between two points on a synthetic hurricane tracks according to aspects of the invention.

Various embodiments and aspects of the invention will now be described in detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways, and the invention is not limited to the example presented unless specifically recited in the claims.

Natural disasters such as tropical cyclones, earthquakes, tornadoes, tsunamis and the like are lethal and costly phenomena, and it is therefore of great importance to assess the long-term risk they pose to society. Accordingly, aspects and embodiments of the present invention may assess the probability that natural disasters will affect a given location by combining an estimate of the probability that an event (e.g., a tropical storm or earthquake) will occur within some given range of the point of interest with an estimate of the spatial probability density of the intensity of the event. Embodiments of the invention combine the use of statistical and deterministic methods to predict event locations and model event intensity, as described in detail below.

It is to be appreciated that the phraseology and terminology used herein is for the purpose of description and should not be regarded as limiting. The use of the words "including," "comprising," "having," "containing," or "involving," and variations thereof herein, is meant to encompass the items listed thereafter and equivalents thereof as well as additional items. In the interest of clarity and simplicity, the following discussion of embodiments of the invention will refer primarily to assessment of risk associated with wind storms, such as tropical cyclones (also referred to as hurricanes). However, it is to be appreciated that the invention is not limited in its application to the prediction and assessment of tropical cyclones and can be applied to other natural disaster such as, earthquakes, typhoons, tsunamis and tornados. Thus, the term "event" may be used to refer generally to any type of dangerous storm or natural disaster including the above examples. The term "wind storm" as used herein is intended to refer generally to any type of storm that has associated high wind speeds, such as tropical cyclones and tornadoes. In addition, the term "intensity" as used herein is intended to refer to a measure of the event's severity. For example, "intensity" in the case of a hurricane may be characterized in terms of maximum associated wind speed or category (i.e., a category 5 hurricane has a greater intensity than does a category 3 hurricane). In the case of an earthquake, intensity may be characterized by the severity and duration of the associated shockwaves or for example, by the Richter scale value associated with the earthquake.

In overview, aspects and embodiments of the invention are directed to systems and methods for assessing the risk that an event having an intensity above some threshold level will occur within a given range of a point of interest. Dealing with events such as hurricanes or earthquakes, from creating building codes to setting insurance premiums, may be greatly facilitated by an accurate assessment of the risk posed by these events to the location of interest. Tropical cyclones account for the bulk of natural catastrophe U.S. insurance losses. Therefore, wind risk assessment for tropical cyclones may be vital to the insurance industry and to government disaster-preparedness programs. Estimates of tropical cyclone risk based directly on the historical record suffer from the overall scarcity of events, particularly in regions that experience infrequent, but sometimes devastating storms. Even in regions suffering a high frequency of events (such as south Florida for hurricanes), fitting standard probability distributions to observations may be inaccurate at the high intensity end of the distribution, which is based on sparse data but which accounts for a disproportionate amount of injury, loss of life, and destruction. Losses associated with tropical cyclones roughly follow a cubic power law with maximum wind speed, meaning that an increase in the maximum wind speed associated with a storm can cause roughly a cubic increase in the losses caused by that storm. Thus, it may be most critical to accurately assess the risk of high intensity storms. However, as mentioned above, prior art risk assessment techniques may be least accurate with regard to high intensity storms due to the infrequency of such events.

Aspects and embodiments of the invention may circumvent these limitations by combining statistical track generation techniques (which allow for synthesis of many thousands of event tracks) with deterministic intensity modeling. The term "track" as used herein refers to the path along which an event may propagate, e.g., the path a hurricane or tornado may take across ocean and land, or the location and radius of shockwaves from an earthquake. By generating a large number of synthetic tracks that pass through an area of interest and that have statistical characteristics that conform to observed data, risk of an event may be assessed even in an area that experiences very few actual events, and where conventional techniques may fail or be inaccurate due to lack of historical data. The tracks may be generated using any one of many statistical track generation techniques and the invention is not limited to any specific method or technique. Similarly, the intensity modeling may make use of any one of a number of atmospheric or climatologic event models that may be tailored to accurately model a given class of events. Thus, using hurricanes as an example, one embodiment of the invention encompasses synthesizing large numbers (e.g., many thousands) of hurricane tracks and then running a deterministic hurricane intensity model along each track. This approach has the advantage of ensuring that the intensity of the event conforms broadly to the underlying physics, including the natural limitations imposed by potential intensity, ocean coupling, vertical wind shear, and landfall, by accounting for these factors in the hurricane intensity model.

According to one embodiment, there is provided an approach to hurricane wind risk assessment in which an estimate of the probability that a hurricane will pass within a specified distance of a point of interest is combined with an estimate of the spatial probability density of storm winds. To assess the probability that storms will pass close enough to the point of interest to affect it, one or both of two largely independent track generation techniques may be used to synthesize a large number of hurricane tracks. In one embodiment, a first technique models each track as a Markov chain, using statistics derived from historical hurricane track data or predicted hurricane track data generated by a climatologic model. A second technique that may be used to generate synthetic event tracks may model the tracks using time-varying synthetic fields represented by mathematical constructions. It is to be appreciated that such a technique may be particularly useful for generating and modeling wind storm tracks. In one example, such a technique may include generating a large class of synthetic time-varying wind fields at two or more atmospheric pressure levels whose statistical properties (e.g., variance, co-variance and monthly means) match observed or predicted data and whose kinetic energy follows a proper geostrophic turbulence law. Each of these techniques for track generation, is discussed in detail below.

Once a collection of tracks passing within a given radius of the point or region of interest has been generated, a deterministic coupled ocean-atmosphere hurricane model may be run along each synthetic track to provide a probabilistic distribution of wind speeds at various points along the tracks. From these wind speed distributions, an overall probabilistic distribution of wind speed at or near the point of interest may be deduced, as well as the probability that wind speed at or near the point of interest will exceed some given threshold. This data can be used to assess the risk that wind storms pose to the point of interest, which can be invaluable to businesses, insurance agencies, government agencies, etc. It is to be appreciated that in general, the invention may not be used to monitor or provide real-time prediction of currently occurring storms, such as may be done by TV or radio weather services. Rather, the invention aims to provide long-term, generalized (e.g. on the order of many years) risk assessment that is derived from probabilistic distributions of event characteristics. In other words, the invention may preferably be used to determine a probability that wind speeds at a given point of interest will exceed a certain threshold value in the next, for example, five to ten years or longer, and not to predict whether a particular hurricane (e.g., hurricane David) will strike the point of interest tomorrow.

Methods for track generation, intensity modeling and event prediction according to embodiments of the invention, may be provided, for example, as a software program that executes on one or more processors or computer systems. The computer system may include, for example, a personal computer (PC), workstation, or other computer system capable of loading and executing computer programs. One or more programs associated with methods of the invention may be loaded from a computer-readable medium such as, for example, a compact disk, loaded from a storage location (e.g., storage associated with a server) through the Internet, or by any other method. Such programs generally include computer instructions, that, when executed, allow the computer system to perform the method steps according to one or more embodiments of the present invention. The computer instructions may be determined through programming in one or more computer languages, and it should be appreciated that any computer language may be used to render aspects of the present invention, and the invention is not limited to any particular language. In addition, results of any of the track generation, intensity modeling and event prediction techniques may be provided as a data set in either printed or electronic form.

A statistical approach to constructing synthetic event tracks can be divided into two phases, namely origination and propagation. Thus, an event track generation technique may begin with a process for defining or generating a large number of genesis locations, i.e., points at which the tracks originate. According to one embodiment, event tracks may be originated by a random draw from a space-time probability density function of genesis locations that is based on a compilation of genesis points derived from either historical data or predicted data generated by a model. In one example, a probability density function of tropical cyclone genesis locations can be derived from tropical cyclone "best track data." Such "best track" data compilations are maintained, for example, by forecasting operations such as the National Oceanic and Atmospheric Administration's Tropical Prediction Center (NOAA TPC) and the U.S. Navy's Joint Typhoon Warning Center (JTWC). In one example, the best track data used may be data that has been accumulated during and after 1970, which was the first year that global satellite detection of tropical cyclones is considered complete.

In one embodiment, the probability of hurricane genesis may be constructed as a three-dimensional field of latitude, longitude and time. This construction begins by using a fine resolution grid covering an area of interest, such as, for example, an area of the Atlantic ocean where hurricanes are known to form, and by counting the number of events (e.g., the number of tropical depressions) within each cell from the data collection used. In one example, this gird may be approximately 0.5° latitude by 0.5° longitude by 5 days and the data collection may be the HURDAT track database maintained by the NOAA TPC. In one example, only post-1970 HURDAT data may be used. Of course it is to be appreciated that grids having different resolution may be used, and other collections of data may be used. These estimates (i.e., counted events) may then be smoothed using any smooth spatially decaying kernel (i.e., a window function), such as Chebyshev, Gaussian, log-normal or other smooth band-limited kernels, most commonly arising from the family of exponential functions. Smoothing is not required, but may be advantageous or may become necessary to reduce sampling discontinuities that are a function of the discrete nature of observed genesis points and the grid resolution.

In one example, the estimates may preferably be smoothed using a three-dimensional Gaussian kernel with isotropic but varying scale in latitude and longitude and a fixed time of 5 days, with an extent of 15 days. It is to be appreciated however, that the invention is not limited to the use of this specific smoothing function, in particular, the Gaussian kernel may have a different fixed time and a different extent as may be appropriate for different applications. The spatial scale of the Gaussian window may be estimated by expanding the neighborhood around any point until N events are included or until a given spatial extent is reached, for example, a 15 degree limit in latitude and/or longitude is reached. Variable resolution (i.e., variable spatial scale) smoothing may be better than smoothing at a fixed resolution because the latter can overestimate and underestimate genesis frequency. Variable resolution can be used to account for event sensitivity to location. For example, hurricanes are far more likely to originate in specific oceanic areas that have appropriate atmospheric conditions as well as favorable depth, temperature and other characteristics. Thus, variable resolution smoothing can adjust the grid for higher sampling at these areas and low sampling at undesirable locations. However, even fixed resolution smoothing may be better than no smoothing at all, which leads to sampling discontinuities as an artifact of discretization.

Referring to FIGS. 1A-1C, there are illustrated examples of genesis probability density functions constructed with no smoothing (FIG. 1A), fixed Gaussian smoothing (FIG. 1B) and variable Gaussian smoothing (FIG. 1C). As can be seen from the figures, the unsmoothed probability density function (FIG. 1A) is fragmented, and the fixed window probability density function (FIG. 1B), while less fragmented, still contains sampling artifacts. FIG. 1C shows the utility of space-varying isotropic smoothing. As can be seen from FIG. 1C, variable resolution smoothing concentrates the genesis probability density function in regions where historical data indicates hurricanes are more likely to form and also reduces sampling error by reducing discretization compared to FIGS. 1B and 1A. The probability density functions illustrated in FIGS. 1A-1C are based on post-1970 HURDAT.

Once constructed, the genesis probability density function may be sampled to generate an event:

$$e_0 = e_0(x_0, y_0, t_g) \quad (1)$$

wherein $x_0$ and $y_0$ are the longitude and latitude of genesis and $t_g$ is a time window within which genesis occurs. For hurricane track genesis, any land points that are selected during sampling may be accorded a zero genesis probability because it is known that hurricanes do not form on land. Accordingly, a smooth discrete space-time genesis probability distribution may be constructed as discussed above using, for example, the post-1970 HURDAT track database, although other data sources may also be used. The genesis probability density function may be written:

$$p_g(x_i, y_i, t_i) = H_g(x_i, y_i, t_i) \otimes G(\cdot, \Sigma_i) \quad (2)$$

wherein $H_g$ is the normalized histogram over space-time of genesis data (which may be historical data such as the HURDAT track database, or predicted data from a climate model), G is the normalized window (e.g., a normalized three-dimensional space-time Gaussian), and the operator is convolution. The genesis probability density function defined by equation 2 describes the likelihood that an event will form at any given location in space-time within a broad spatial region of interest (e.g., the Atlantic Basin). The genesis probability density function may be sampled a large number of times (e.g., many thousands of times) to define origination points for the corresponding large number of tracks that are to be synthesized using, for example, one or both of the statistical track generation methods described below.

According to one embodiment, an event track generation technique may use certain features of historical tracks and generate synthetic tracks in time interval steps using a Markov chain for each time-step displacement. A Markov chain is a sequence of random values whose probabilities at a time interval depends upon the value of the number at the previous time. A simple example is the nonreturning random walk. Genesis points may be sampled from the genesis probability distribution and each sample may be integrated forward in time steps as a Markov chain. Each time step may depend both on the properties of the last step and on the climatological probability distribution of rates of change of displacement at the current position and time. By this means, the synthetic tracks may conform to observed statistics (as a function of space and time) of the motion of historical events, while preserving a memory of their previous motion. Specifically, for hurricane tracks, the track features may include the spatio-temporal distribution of genesis and storm motion, and each time interval/step may be six hours, to correspond to the fact that most historical data (e.g., the HURDATA database) is recorded at six hour intervals. The Markov chain model for hurricane tracks is motivated by the fact that the temporal autocorrelation spectra of translation speed and angles (direction) suggest meaningful correlation-length scales of no longer than three (six hour) time units, indicating a process that is well-modeled as a Markov process.

Once initiated, there are several ways that a track may be stepped forward in, for example, six hour, intervals as a Markov chain. One option is to construct a probability density function parameterized in terms of latitude and longitude: $p(x_{i+1}, y_{i+1}|x_i, y_i)$ at a chosen time window $t_g$, but this method may suffer from two problems. First, tracks may become very sensitive to resolution, and second, there is no easy way to interpolate between grid nodes because this probability density function does not capture the continuity that is inherent in hurricane tracks. A notable feature of hurricane tracks is that they appear to be relatively smooth. There is a strong relationship between a storm's current and prior speed and direction, and there is continuity across space between these variables.

Therefore, according to one embodiment, tracks may be synthesized using an intrinsic parameterization of the track characteristics, including differential properties to describe the intrinsic structure of the tracks. In one example, the genesis event can be integrated forward in six-hour steps as a Markov chain using translation speed and direction and their rates of change over the six hour time interval as state variables. It is to be appreciated that other state variables may also be used, particularly if the method is being used to generate tracks for events other than hurricanes. However, for hurricane track generation, these state variables may be advantageously used because they can better represent track continuity than does a latitude-longitude-time parameterization.

Referring to FIG. 2, there is illustrated a diagrammatic representation of track propagation using this parameterization. The genesis event:

$$e_0 = e_0(x_0, y_0, t_g) \quad (3)$$

initiates a track that may be propagated forward using a one-step Markov chain conditioned by locations traversed in the (x, y) field within the time window $t_g$. Transitional probabilities for the Markov chain may be constructed using variable resolution, kernel-smoothed non-parametric densities conditioned on prior state, time and position. Therefore, at a given location 100 on the grid, $(x_i, y_i)$, this parameterization computes a conditional distribution of instantaneous rates of change of track speed and angle given prior speeds and angles. A sample drawn from this distribution may then be integrated forward to obtain a new location 102 for the track, $(x_{i+1}, y_{i+1})$. As shown in FIG. 2, and as discussed below in more detail, current location of the track 100 is conditioned on the track's previous translation speed and direction 104, and the next location of the track 102 is similarly conditioned on the current translation speed and direction 106.

Probability distributions for speed and direction of the tracks may be based on historical data or simulated data from, for example, a climatological model or simulation program. Such historical or simulated data is used to create statistics regarding storm track characteristics such as speed and direction such that the simulated tracks conform generally to these statistics. In this manner, simulated tracks can be created that are representative of actual track. In one example, data from the HURDAT track database may be used, however, other data compilations may also be used. For this purpose, historical hurricane data over an entire period of record may used (rather than only post-1970 data as may be used to construct the genesis probability density function) because observed storm movement may be more accurate than storm origin locations in the pre-satellite era. However, it is to be appreciated that the invention is not limited to the use of any particular data set and any appropriate collection of data may be used to generate track statistics. In one embodiment, the conditional probability density functions for speed and direction may be generated using multi-resolution kernel-smoothed non-parametric density estimates from raw histograms which are derived from the track data compilation being used (e.g., the HURDAT track database). Kernel-smoothed, variable resolution representations may be used so as to produce distributions that are not prone to sampling failures.

Figure 3A:
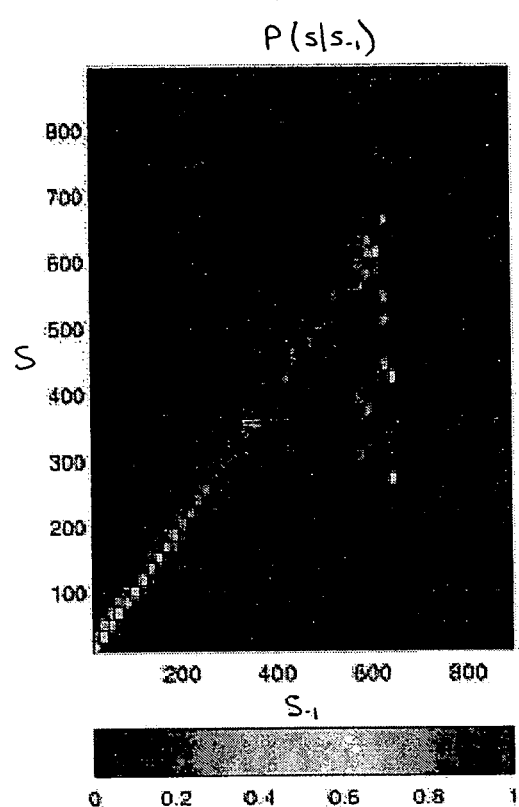
FIG. 3A is a graph of an example of the probability of speed at a point on a track as a function of the speed at a previous point on the track.
Figure 3B:
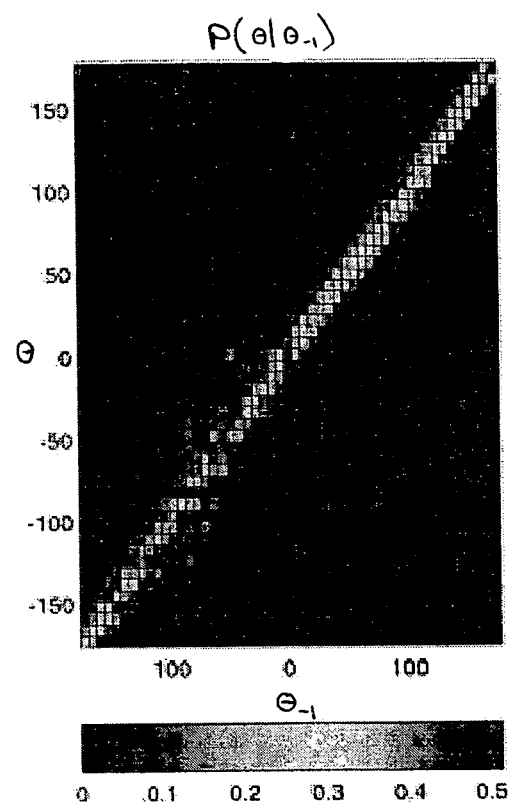
FIG. 3B is an example graph of the probability of direction at a point on a track as a function of the speed at a previous point on the track.

Referring to FIGS. 3A and 3B, there are illustrated the current conditional densities of speed (FIG. 3A) and angle (FIG. 3B) given their one step prior values ($s_{-1}$ and $\theta_{-1}$). As can be seen in FIGS. 3A and 3B, there is a nearly linear relationship between the current and previous states for both speed and direction. Therefore, constructing the transition probabilities for the Markov chain in terms of the rates of change of the state variables (speed and direction) may be advantageous because it may produce conditional probability density functions in a nearly resolution-independent manner. Without using rate-based representation, to generate speeds for synthetic tracks that have smoothness similar to observed tracks may require a very high discretization of the conditional probability density function for speed. This may be undesirable because of the computational power and storage space required as well as because there may be insufficient data to populate the transition matrix, particularly for synthetic tracks that travel in areas where observed hurricane data is scarce. By modeling the conditional probability density functions as rates of change of speed and direction given prior speeds and directions, respectively, it is possible to produce fairly course resolution representations that nonetheless do not cause sampling failure problems. In addition, in one example, only the one step prior speed and direction may be used because it has been found for hurricane track data that the maximum correlation is only twelve hours (two steps) and thus for rate information, using data from just one step prior is sufficient. This is also advantageous in that it makes computing the Markov chain simpler than would be the case if multiple prior step data were required. In one example, rates of change of speed and direction in the raw histograms (i.e., derived from the database before smoothing) may be discretized to 8 km/6 hr/6 hr and 3 degrees, respectively, prior speed may be discretized to 40 km/6 hr and prior direction may be discretized to 20 degrees. However, it is to be appreciated that these are examples are not limiting and the degree of discretization for each state variable may be selected considering many factors such as computation speed and efficiency, availability of raw data, etc.

Considering the foregoing, according to one embodiment, a method of synthesizing tracks using a Markov chain process may include the following overall steps. At a given time and location 100 (see FIG. 2), a conditional probability density function can be computed using translation speed and direction as state variables and wherein the rates of change of the state variables are conditioned on prior values of the state variables. This conditional distribution is written:

$$p_i(\dot{s}_i, \dot{\theta}_i | s_{i-1}, \theta_{i-1}, e_i) \quad (4)$$

where $e_i$ is the genesis probability density function, namely:

$$e_i = e_i(x_i, y_i, t_g) \quad (5)$$

s and θ are the 6-hour (or other time interval if a different time interval is being used) displacement magnitude (speed) and direction, respectively, and the overdots represent time rates of change.

Next, this conditional distribution may be sampled to select points that will be integrated forward to provide the next positions of the tracks. It should be noted that all samples from the above conditional distribution $p_t$ carry the same genesis time. In one example, the distribution may be sampled using a "hit and miss" method for a fixed interval of time. If no samples are available using this "hit and miss" approach, the cumulative probability density function can be computed and used to provide samples. It is possible to always use the cumulative probability density functions to obtain the samples, however, in cases where the conditional distributions $p_t$ are "broad" (i.e., fairly uniform or a wide Gaussian-type distribution as opposed to a sharp or narrow distribution), the hit and miss approach may be substantially faster.

In order to propagate the track, for each time step, the new position may be calculated by integration from currently estimated angle and speed rates according to the equation:

$$\begin{pmatrix} x_{i+1} \\ y_{i+1} \end{pmatrix} = \begin{pmatrix} x_i \\ y_i \end{pmatrix} + (s_{i-1} + \dot{s}_i \delta t) \frac{180}{\pi a} \begin{pmatrix} \sin(\theta_{i-1} + \theta_i^* \delta t) \\ \cos[\theta_{i-1} + \theta_i^* \delta t] \\ \cos\left(\frac{\pi y_i}{180}\right) \end{pmatrix} \quad (6)$$

Here, a is the radius of Earth and δt is the time step, for example, six hours. The joint distribution of speed and direction $p_t$ can be highly dimensional and sparse when populated using HURDAT or another similar data source (because the frequency of hurricane events is low). Therefore, in order to simplify the representation, conditional independence can e enforced between the two state variables (speed and direction). So doing splits the joint probability to:

$$p_t(\bullet) = p_s(\dot{s}_i | s_{i-1}, e_i) p_\theta(\dot{\theta}_i | \theta_{i-1}, e_i) \quad (7)$$

where $e_i$ is controlled to enforce conditional independence between s and θ.

Tracks may be propagated by continuing to integrate forward until some point when the track terminates. In one embodiment, tracks may be terminated using a termination probability density function constructed in a manner similar to the genesis probability density function from historical or simulated track data. According to another embodiment, tracks may be terminated when searches at multiple space-time resolutions fail to produce evidence for a transition and the Markov chain therefore cannot be continued. Similar to the manner in which genesis data is collected (described above), hurricane movement data can also be collected and used to provide statistics to which synthetic tracks may conform. Data collection may begin by using a fine resolution space-time grid covering an area of interest and one or more time periods over a year, and by counting the number of events (e.g., observed hurricanes) within each cell from the database used. From these counted events, information about the state variables (e.g., speed and direction) may be extracted and used to form histograms that can be sampled so as to obtain statistical information about the state variables. In one example, a multi-resolution representation of the probability density functions of the rates of change of speed and direction in space and time may be used to sample the state variables (speed and direction) according to a priority "schedule." This may be done as a heuristic because a problem with a fixed space-time resolution of transition probabilities of state variables is that scarcity of data (e.g., HURDAT data) can easily lead to "dead" tracks where no data are available. To avoid this, one embodiment uses a sampling approach that attempts to gather the best evidence for propagating a track before letting it terminate. This may be accomplished by constructing a sampling priority schedule, one example of which is illustrated in FIG. 4.

Hurricanes are known to be sensitive to both time and location. In other words, certain locations have been historically shown to suffer many hurricanes, and hurricanes are known to form more frequently during some months of the year and not at all during other months. Thus, the "first choice" (priority 1 on FIG. 4) for collecting hurricane data uses a fine resolution grid in space, e.g., a grid approximately 0.5° latitude by 0.5° longitude as shown in block 110 and also a fine resolution in time. In the illustrated example, the year may be divided into nine time periods, as shown in block 112 in FIG. 4. If no data, or insufficient data, is collected using the "first choice" resolution then either the area or the time period may be expanded in the hopes of locating some data points (i.e., some event occurrences).

It is to be appreciated that the invention is not limited to the specific example shown in FIG. 4. The year may be divided into more or fewer than nine time periods. Also, it should be noted that the time periods do not need to be uniform. For example, as it is known that hurricanes are most likely to exist during the months of September to November, several of the nine time periods may be used to finely cover these months. Historically, virtually no hurricanes form between January and March and thus one time period may be used to account for these three months, or alternatively, they may be ignored entirely, with all nine time periods being used to cover the remaining months. In addition, a grid having a resolution other than 0.5 degrees square may be used to divide the spatial area. If no or too little data is accumulated using the resolution that is priority 1, the resolution may be expanded to priority 2, which in this example, allows a wider (lower resolution) spatial grid, for example, a 5 degree square gird as indicated in block 114 on FIG. 4, while keeping the time discretization the same. Again, if no or too little data is collected, resolution may be increased to priority 3, which again expands the spatial resolution while keeping the time resolution the same.

In one example, "priority 3" spatial resolution may include three manually constructed latitude bands, as indicated by block 116. These bands may be positioned in areas where it may be most likely to obtain event data. If again no or too little data is found, resolution may be increased again to the "priority 4" settings, and so on. As shown in FIG. 4, this particular example accounts for the fact that hurricanes may be generally more sensitive to time than location—tropical depressions may form over a wide area of, for example, the Atlantic ocean; however, they will only form during certain times of the year. Thus, the higher priority resolutions may degrade spatial resolution before degrading time resolution. However, it is to be appreciated that the schedule in FIG. 4 is given as an example and is not intended to be limiting. Different resolutions may be used and priorities may also be different, particularly if data is being collected for events other than hurricanes. In this, or a similar manner, statistical data of historical or simulated hurricane (or other event) tracks may be accumulated so as to create probability histograms for each state variable (e.g., speed and direction).

According to one embodiment, transition probability density functions at any given space-time resolution may be smoothed outputs of the corresponding histograms in space and state variables. As with the genesis probability density functions described above, three-dimensional normalized Gaussians may be used for smoothing in x, y and z, where z is the rate of change of either speed or direction (depending on for which state variable the transition probability is being calculated). In one example, the extent in x and y may be variable so as to encompass a constant number of total data points. In one example, the scale or width of the Gaussian in z ($\sigma_z$) may be fixed to the state-resolution used. However, it may also be determined by application of an optimization technique. Using the transition probability density function so constructed, tracks may be propagated until they terminate due to lack of data after following the sampling schedule. This may be very rare, given that in the illustrated example in FIG. 4, the lowest priority level ("priority 8" allows for data collection in a one-cell grid that covers an entire year and the entire globe. Alternatively, tracks may be terminated if they reach a location with weakly observed hurricane activity in the database being used (e.g., HURDAT).

In another embodiment, the intensity model may be used to at least in part control track termination, as discussed below. In this embodiment, hurricane tracks may be continued over land and/or cold water because the intensity model will cause the storms to decay under such circumstances, as discussed further below.

Figure 5:
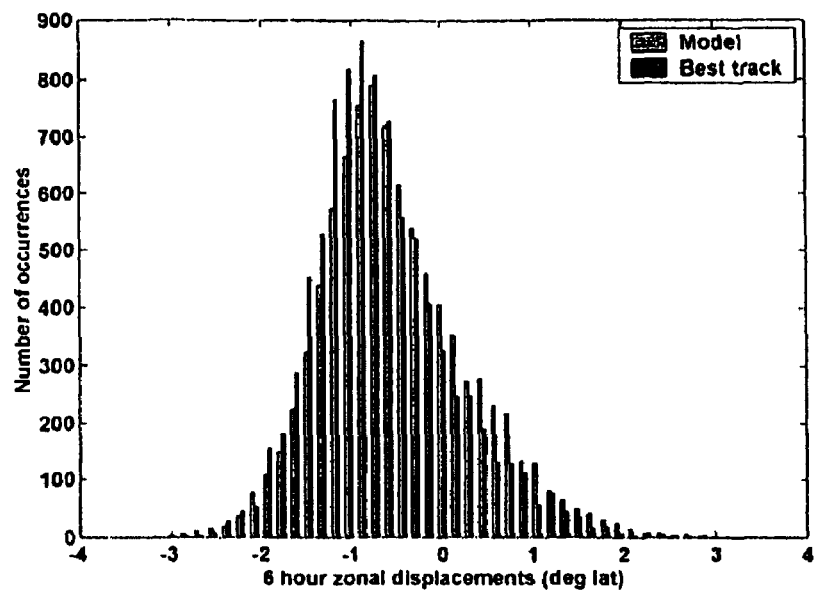
FIG. 5A is a graph comparing histograms of observed hurricane data with synthetic hurricane tracks generated according to an embodiment of the invention.
FIG. 5B is a graph comparing histograms of observed hurricane data with synthetic hurricane tracks generated according to an embodiment of the invention.
Figure 5:
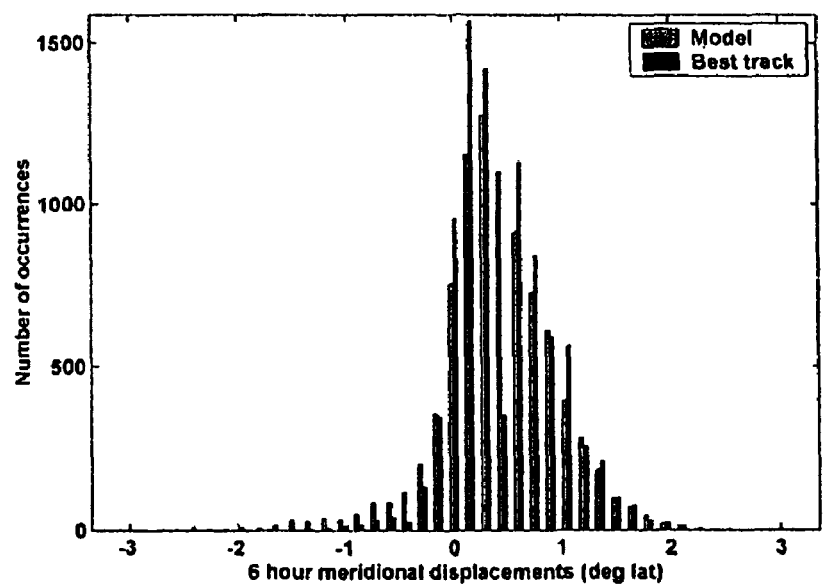

Thus in summary, according to one embodiment, a statistical track generation method may initiate hurricane tracks using statistical features (e.g., spatio-temporal distribution of genesis locations and storm motion) that are based on either historical or simulated data, as discussed above, and then generate the synthetic tracks taking 6-hour steps and using a Markov chain for each 6-hour displacement. In this Markov process, each 6-hour step depends both on the properties of the last step and on the climatological probability distribution of rates of change of displacement at the current position and time, such that the synthetic tracks have statistics that match those of observed or modeled storms. Referring to FIGS. 5A and 5B there are illustrated histograms that compare the 6-hour displacement statistics from 1000 synthetic tracks generated using this Markov chain process with observed displacement statistics. The observed displacement statistics are taken from HURDAT data covering a region of the North Atlantic ocean bounded by 10° and 30° North latitude and 80° and 30° West longitude. This region was selected as one in which the synthetic tracks are likely to be maintained in an intensity model rather than an area, such as just East of North America, where a large number of tracks may have trajectories over land and are therefore unlikely to be maintained in an intensity model. FIG. 5A illustrates histograms of an observed (black) and modeled (gray) frequency distribution of 6-hour zonal displacements for this region of the Atlantic, and FIG. 5B illustrates histograms of observed (black) and modeled (gray) frequency distributions of 6-hour meridional displacements. These figures illustrate a good correlation between the statistics of actual observed storms and synthetic storm tracks generated according to an embodiment of the invention.

Figure 6B:
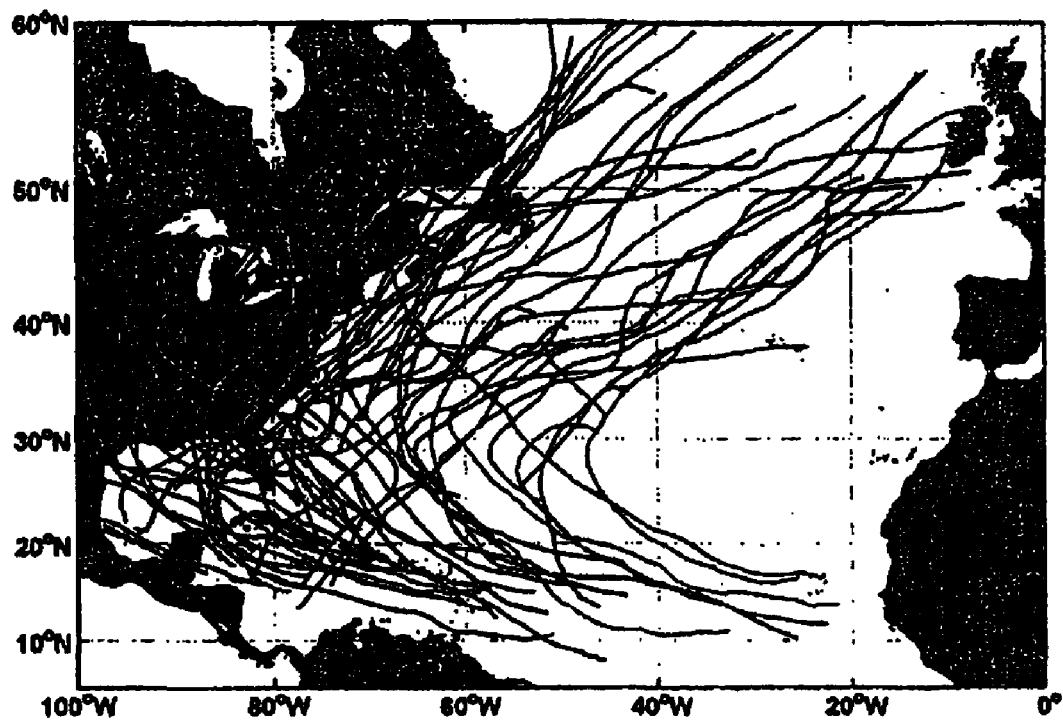
FIG. 6B illustrates a random sample of 60 synthetic tracks generated using a Markov Chain method according to another embodiment of the invention.
Figure 6A:
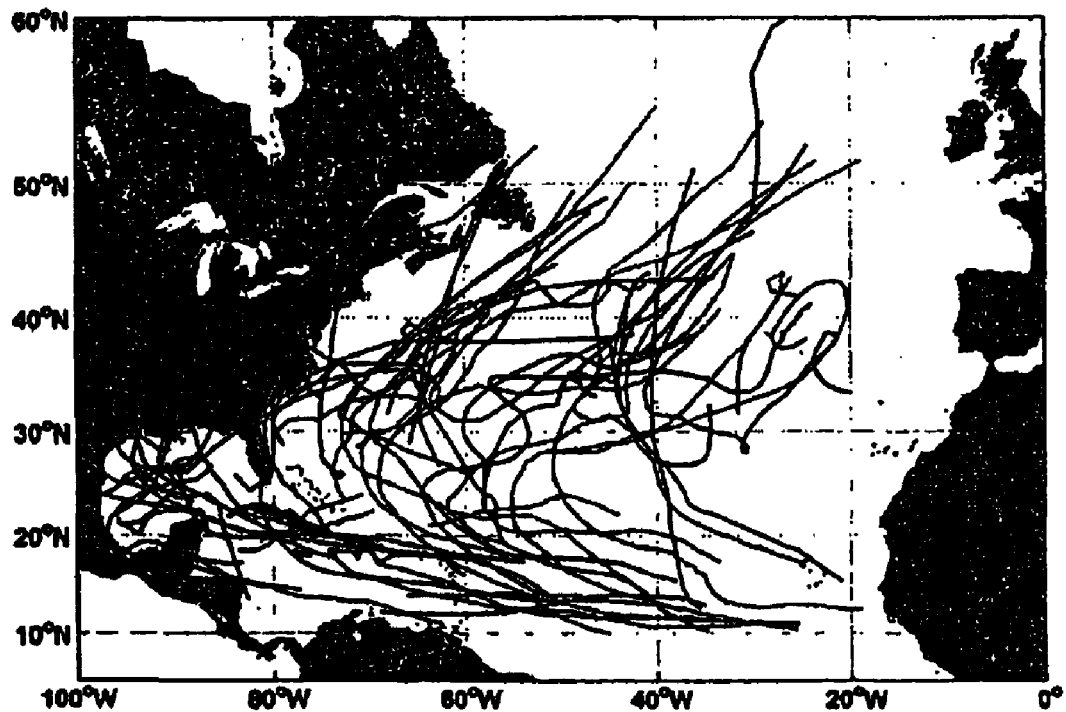
FIG. 6A illustrates a random sample of 60 hurricane tracks from the HURDAT database.

Referring to FIGS. 6A and 6B there is illustrated another comparison of observed hurricane tracks with synthetic hurricane tracks generated using a Markov chain method according to an embodiment of the invention. FIG. 6A illustrates a random sample of 60 hurricane tracks from the HURDAT database. FIG. 6B illustrates a random sample of 60 synthetic tracks generated using a Markov Chain method according to aspects of the invention. As can be seen from the figures, in general, the shape of the synthetic and actual tracks is similar, although the synthetic tracks are somewhat smoother. These figures provide further evidence of good correlation between the synthetic tracks and observed tracks.

Among the many processes that influence hurricane intensity is the vertical shear of the environmental wind, and it may therefore be preferable to account for varying wind shear to model realistic variations in hurricane intensity. As mentioned above, once a plurality of synthetic tracks have been generated, for example, using the Markov chain method described above, event intensity is modeled along each track. The Markov chain method for track generation does not account for wind shear and thus, when the intensity is modeled along each track, it must be assumed that the track and the shear are largely independent. In one embodiment, this may be at least partially circumvented by using reanalysis data to develop statistical relationships between historical hurricane tracks and environmental wind.

According to another embodiment, a technique may be used to generate synthetic wind storm tracks and shear from the same synthetic wind fields. To at least a first approximation, hurricanes move with a weighted vertical mean of the environmental flow in which they are embedded, plus a "beta drift" owing to the effect of the vortex flow on the ambient potential velocity distribution. Using this technique, synthetic tracks and environmental wind fields can be created that are mutually consistent, as discussed further below.

Such a technique may include generating a large class of synthetic, time-varying wind fields at two or more atmospheric pressure levels. These wind fields may be constructed such that their variance, co-variance and monthly means match those derived from a selected global wind data base, such as the NCEP/NCAR re-analysis data, or output from a global weather or climate model This facilitates generating event tracks having statistics that conform to actual data and are thus realistic. If this track generation method is being used to synthesize hurricane tracks, these pressure levels may include an 850 hPa level and a 250 hPa level because it has been shown that these two levels can be used to define a good steering flow. In addition, it has been shown that the wind shear between these two levels is well correlated with hurricane intensity change. Therefore, for the sake of clarity and simplicity, the following discussion of embodiments of this track generation technique may primarily refer to these pressure levels. However, it is to be appreciated that the invention is not limited in this regard and many other pressure levels may be used as appropriate for a specific application. The wind fields may be used both to generate synthetic hurricane tracks and to generate realistically varying environmental wind shear along each track which may be used in the intensity model, as discussed further below.

According to one embodiment, a method for generating a large number (e.g., several hundreds to many thousands) of synthetic tracks may begin with a genesis technique such as that described above to originate a large number of events. Once originated, the events are moved, that is, their tracks may be generated, under the assumption that wind storms move with some vertical mean plus a drift term. As discussed above, to keep matters simple, winds at the 850 hPa and 250 hPa pressure levels may be used, although it should be noted that results may be slightly improved by including other levels. The motion of each wind storm (e.g., hurricane) may be modeled as a weighted average of the ambient flow at these two levels, plus a constant or latitude-dependent beta drift correction that accounts for the effect of coriolis force. In principle, this beta drift correction should decrease as the cosine of latitude, but it has been shown that as storms move to higher latitudes, other steering influences come into play that introduce errors at least as large as those arising from omitting this cosinal decrease. Therefore, for simplicity, a constant beta drift correction may be used.

Figure 7:
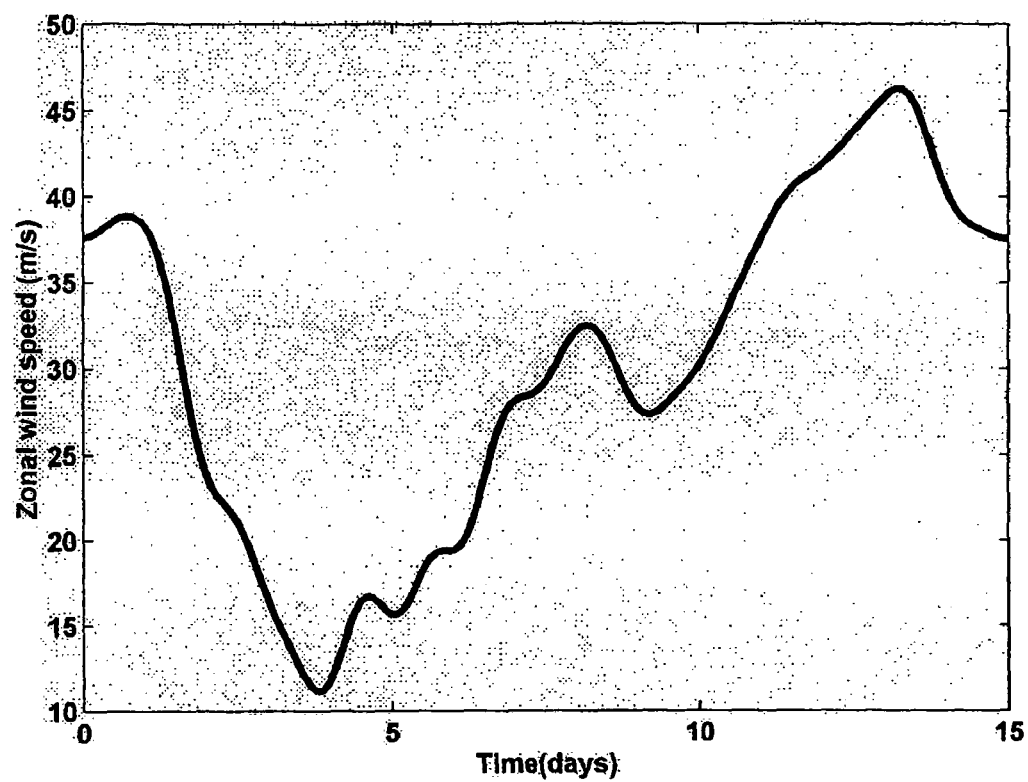
FIG. 7 is a graph of zonal wind speed versus time for a zonal wind component modeled as a Fourier time series, according to an embodiment of the invention.

In one example, a synthetic time series of the zonal wind component at 250 hPa may be generated, modeled as a Fourier series in time with random phase and designed to have the observed monthly mean and variance from the mean. It is to be appreciated that the term "observed" as used in this context is intended to refer to recorded wind statistics either from historical data (e.g., the HURDAT database) or from a model or simulation, such as a global climate model. In one example, the amplitude of the Fourier series is selected to be the square root of the observed variance, so that the series has the correct variance. The 250 hPa zonal wind component can thus be written:

$$u_{250}(x,y,\tau,t) = \bar{u}_{250}(x,y,\tau) + \sqrt{\overline{u_{250}'^2}(x,y,\tau)} F_1(t) \quad (8)$$

where: $\bar{u}_{250}(x, y, \tau)$ is the monthly mean zonal flow at 250 hPa interpolated to the date and position of the storm, $\overline{u_{250}'^2}(x, y, \tau)$ is its variance from the monthly mean, and $F_1$ is defined:

$$F_1 = \sqrt{\frac{2}{\sum_{n=1}^{N} n^{-3}}} \sum_{n=1}^{N} n^{\frac{-3}{2}} \sin\left(2\pi\left(\frac{nt}{T} + X_{1n}\right)\right) \quad (9)$$

where T is a time scale corresponding to the period of the lowest frequency wave in the series, N is the total number of waves retained, and $X_{1n}$ is, for each n, a random number between 0 and 1·ln(1). $\tau$ is a slow time variable corresponding to the linearly interpolated variation of the monthly mean flow with time, while t is a fast time scale. The time series thus has the observed monthly mean and variance, while the coefficients in (9) are chosen so that the power spectrum of the kinetic energy of the zonal flow falls off as the inverse cube of frequency (i.e., $\omega^{-3}$), mimicking the observed spectrum of geostrophic turbulence. In one example, T can be chosen to be 15 days and N=15 can be used. However, it is to be appreciated that these are simply examples, and other values can be chosen. Referring to FIG. 7, there is illustrated a graph of an example of a zonal wind component modeled as such a time series, with a monthly mean zonal flow at 250 hPa of 30 ms$^{-1}$ and a square root variance of 10 ms$^{-1}$.

Using the above-described technique, a synthetic time series of the meridional wind component at 250 hPa can also be generated. In addition to the constraints placed on the zonal component (i.e., monthly means and variances that conform to observed statistics), the meridional time series may be constrained to have the observed covariance with the 250 hPa zonal wind. Further, synthetic time series of both the 850 hPa wind components may be generated and constrained to have the observed means, variances and covariances with their respective components at 250 hPa and with each other. Thus, the time series for the other flow components, namely the 250 hPa meridional flow $v_{250}(x, y, \tau, t)$, the 850 hPa zonal flow $u_{850}(x, y, \tau, t)$, and the 850 hPa meridional flow $v_{850}(x, y, \tau, t)$, can be modeled according to:

$$v_{250}(x,y,\tau,t) = \bar{v}_{250}(x,y,\tau) + A_{21}F_1(t) + A_{22}F_2(t)$$

$$u_{850}(x,y,\tau,t) = \bar{u}_{850}(x,y,\tau) + A_{31}F_1(t) + A_{32}F_2(t) + A_{33}F_3(t) \quad (10)$$

$$v_{850}(x,y,\tau,t) = \bar{v}_{850}(x,y,\tau) + A_{41}F_1(t) + A_{42}F_2(t) + A_{43}F_3(t) + A_{44}F_4(t)$$

where the $A_{ij}$ are coefficients whose determination is discussed below, and the Fs have the same form as (9), but with different random phase. Thus, the different Fs are uncorrelated. Thus, the flow components at the two pressure levels can be written in matrix form:

$$V = \bar{V} + AF \quad (11)$$

where V is a vector containing the zonal and meridional velocity components, $\bar{V}$ is the climatological mean flow, F is the vector of uncorrelated time series of random phase (and amplitude of unity, as seen in (9)), and A is a lower triangular matrix of coefficients that satisfies:

$$A^T A = COV \quad (12)$$

where COV is a symmetric matrix containing the variances and covariances of the flow components.

In one example, when constructing the covariance matrix, any correlation between the zonal flow at 250 hPa and the meridional flow at 850 hPa and between the zonal flow at 850 hPa and the meridional flow at 250 hPa can be ignored. Therefore, because COV is symmetric and positive definite, the matrix A can be found from COV by Cholesky decomposition. Furthermore, in one embodiment, there may not be explicit modeling of spatial correlations of the mean flow. In effect, it may be assumed that the time scale over which a hurricane traverses typical length scales associated with time-varying synoptic-scale systems is large compared to the time scale of fluctuations at a fixed point in space. However, each synthetic storm may feel the effects of spatial variability of the monthly mean flow and its variance.

According to one embodiment, the monthly means, variances and covariances can be calculated using either historical data from, for example, the NCEP/NCAR re-analysis data, or simulated data from, for example, a global model. In some examples, it may be advantageous to use simulated data to generate tracks and predict wind speed probabilities that take into account predicted future climate conditions, as discussed further below. In another example, the monthly means, variances and covariances may be calculated using a certain number of years (e.g., 40 years) of data from the NCPE/NCAR reanalysis data set described in a paper by Kalnay and coauthors (Kalnay, E. and coauthors, 1996: The NCEP/NCAR 40-year reanalysis project. *Bull. Amer. Meteor. Soc.*, 77, 437-471). Given the time series of the flow at 250 hPa and 850 hPa, as calculated above, it is then straightforward to calculate the magnitude of the 850-250 hPa wind shear.

As discussed above, the wind fields calculated above can be used to synthesize a large number of synthetic hurricane tracks using a weighted mean of the 250 and 850 hPa flows, plus a correction for beta drift. The vector flow for a synthetic track can be written:

$$V_{track} = \alpha V_{850} + (1-\alpha)V_{250} + V_\beta \quad (13)$$

where $V_{250}$ and $V_{850}$ are the vector flows at the two pressure levels, synthesized using the above-described technique, $\alpha$ is a constant weight, and $V_\beta$ is a constant vector beta drift term. In one example, the weight and the vector beta drift may be chosen somewhat subjectively to optimize comparisons of synthesized and observed displacement statistics so as to make the synthetic tracks more realistic. For example, empirically determined values of $\alpha=0.8$, $u_\beta=0$ ms$^{-1}$ and $v_\beta=2.5$ ms$^{-1}$ may be used, although it is to be appreciated that other values are also possible and may be selected based on the observed data set being used and the type of track being synthesized.

Given $V_{track}$ from equation (13), an integration can be performed:

$$\frac{dx}{dt} = V_{track} \quad (14)$$

to integrate $V_{track}$ forward in time to find the position vector x along each track. In one example, a 30 minute forward time step may be used, however, it is to be appreciated that many other values may be selected. The mean fields, variances and covariances (from reanalysis data as discussed above) may then be linearly interpolated in space and time to the new position (and new date). In one example, the mean may be assigned to the 15$^{th}$ day of each month, however, of course any day may be selected, with the 15$^{th}$ chosen here simply for convenience. The position equation may then be stepped forward again, and so on, to generate the entire tracks.

Unlike the Markov chain technique for synthesizing tracks, this method may not encounter the problem of running into an area in which generation statistics are poor (which terminates the tracks in the Markov method). Therefore, tracks may be terminated if maximum winds fall below a selected value, for example, 13 ms$^{-1}$, if the position indicates travel outside of a predetermined area of interest, or after a set time period, for example, thirty days. It is to be appreciated that the selected value of maximum wind speed and/or durational time period are not limited to the examples given herein and may be chosen based on a number of factors, including, for example, historical storm information. For example, historical information may indicate that most hurricanes die when their translational speed drops below a certain limit, or that most hurricanes do not survive for more than a set number of days, and this information may be used to set limits for terminating the synthetic tracks.

Figure 8:
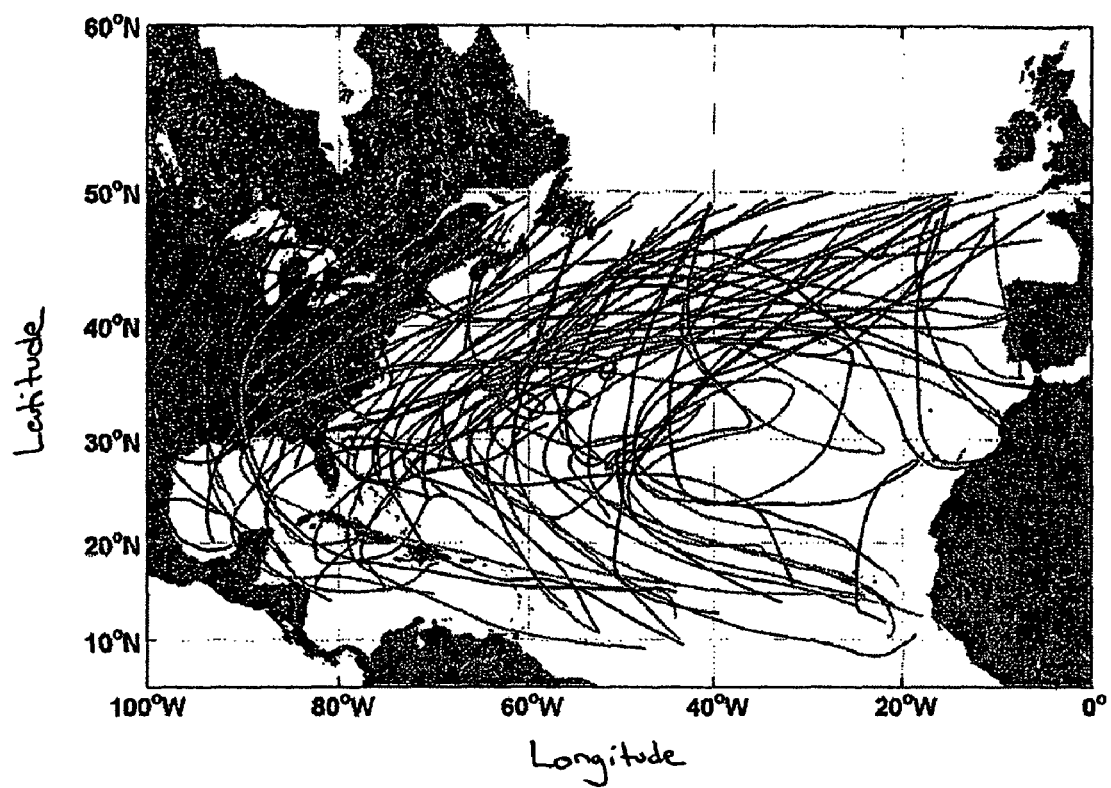
FIG. 8 illustrates a random sample of 60 synthetic tracks generated using a wind-field method according to another embodiment of the invention.

Referring to FIG. 8, there is illustrated a representation of sixty randomly selected tracks produced using an embodiment of the wind-field method described above. These tracks may be compared to the tracks generated using the Markov chain method shown in FIG. 6B and with the randomly selected historical tracks shown in FIG. 6A. As can be seen from the figures, the tracks generated using the wind-field method (FIG. 8) may be somewhat more variable than the tracks produced using the Markov chain method (FIG. 6B), with some tracks executing loops etc.

Figure 9A:
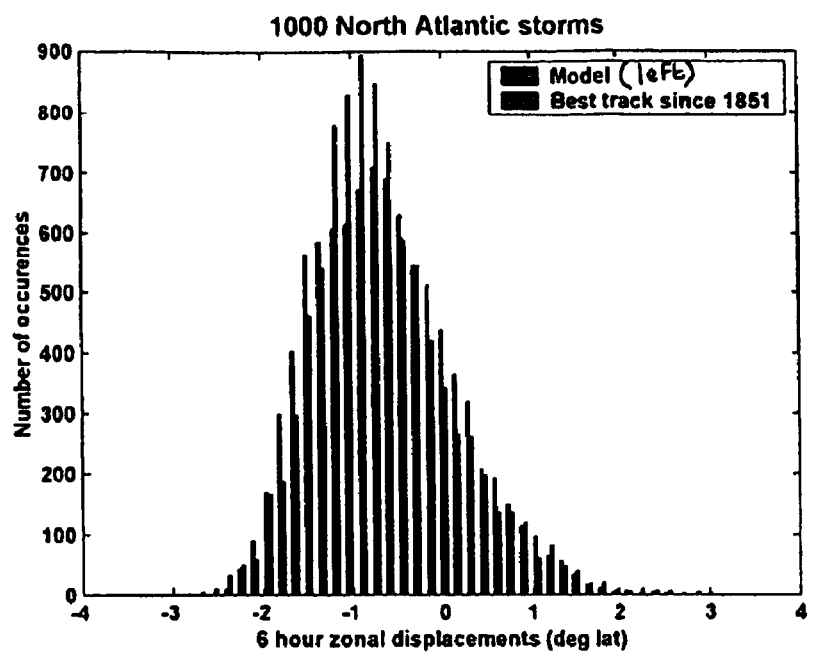
FIG. 9A is an illustration of a histogram of zonal 6-hour displacements for 1000 synthesized tracks compared to the statistics of historical tracks (taken from the HURDAT database) in a bounded North Atlantic region.
Figure 9B:
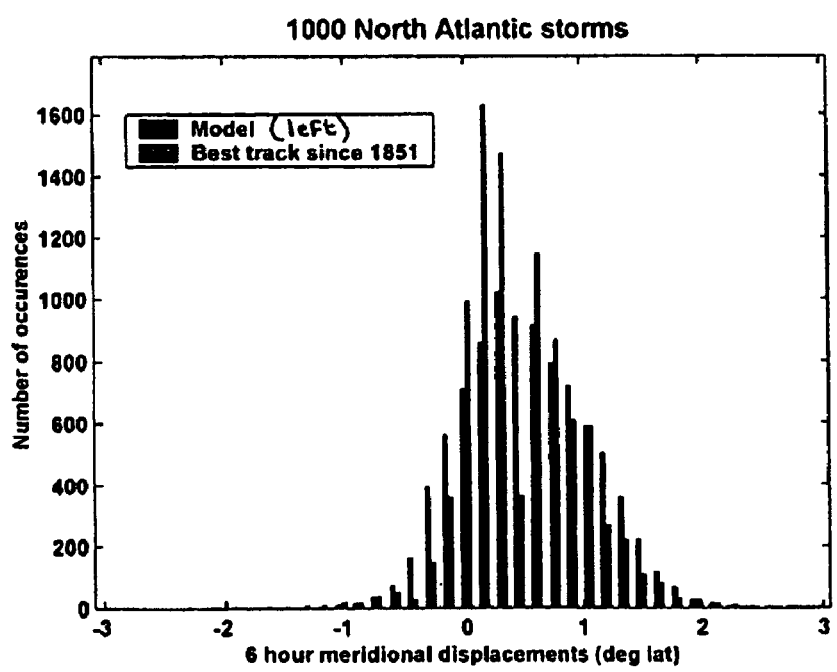
FIG. 9B is an illustration of a histogram of meridional 6-hour displacements for 1000 synthesized tracks compared to the statistics of historical tracks (taken from the HURDAT database) in a bounded North Atlantic region.
Figure 10:
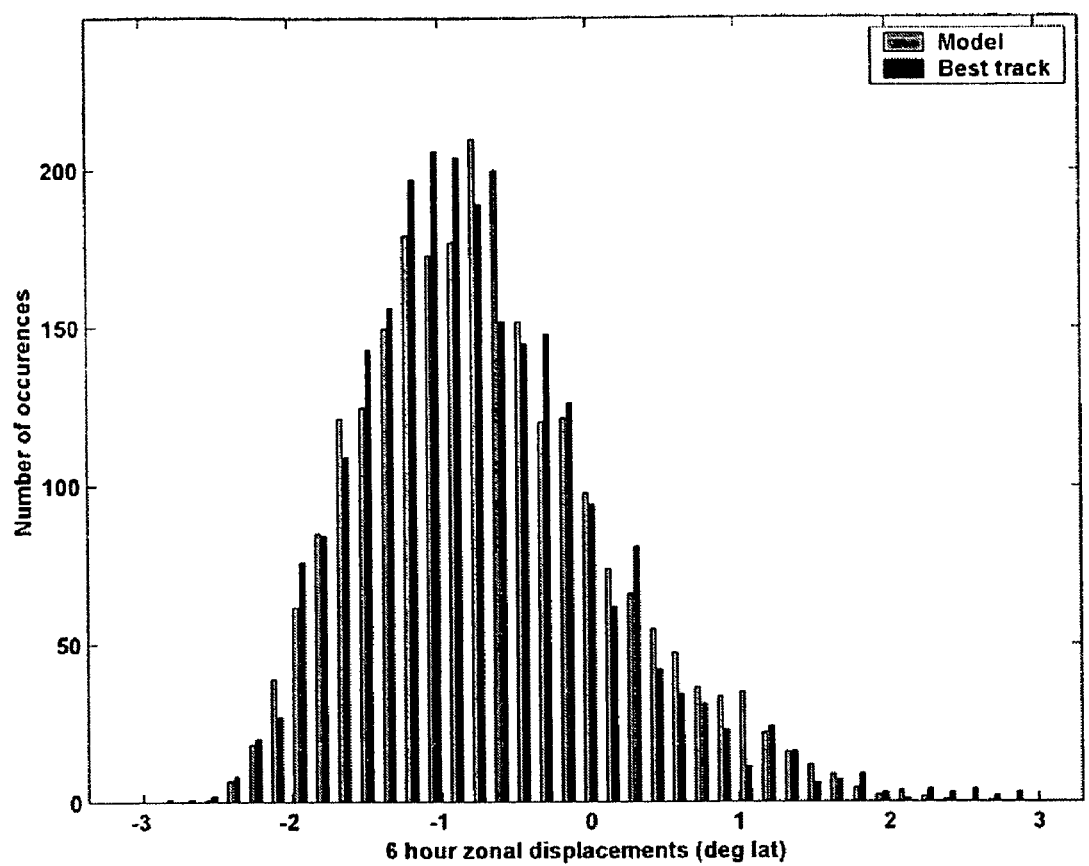
FIG. 10 is an illustration of a histogram of zonal 6-hour displacements for 1000 synthesized tracks compared to the statistics of historical tracks (taken from post-1970 HURDAT data) in a bounded North Atlantic region.

Referring to FIGS. 9A and 9B, there are illustrated histograms of zonal (FIG. 9A) and meridional (FIG. 9B) 6-hour displacements for 1000 synthesized tracks compared to the statistics of all 1289 historical tracks (taken from the HURDAT database) in the North Atlantic bounded by 10° and 30° North latitude and 80° and 30° West longitude. The actual ("best track") data is shown in gray and the synthesized track data is shown in black. These figures can also be compared to FIGS. 5A and 5B which compare zonal and meridional displacement statistics of tracks synthesized using the Markov chain method to actual track statistics in the same region. It can be seen that the wind-field method may produce 6-hour displacement distributions that are slightly too broad compared to either the historical tracks or the tracks produced using the Markov chain method. This may be explained by a number of factors. For example, the synthetic time series of winds used to generate the tracks are approximations to real wind fields and thus account for some error. Also, modeling the hurricane movement with a weighted mean of the 250 hPa and 850 hPa winds plus a constant beta drift correction is also an approximation which introduces some error, especially considering that beta drift is actually variable and that other factors such as vertical shear also contribute to storms' movement. In addition, this method allows tracks to continue in flows that are unfavorable to tropical cyclone maintenance. However, when the intensity model in run along the tracks, those tracks in flows unfavorable to storm maintenance will naturally terminate, as discussed further below. Furthermore, the HURDAT statistics may not be completely accurate, particularly in the pre-satellite era, which may account for some variation between the synthesized track data and the historical track data. Thus, FIG. 10 illustrates a histogram of the 6-hour zonal displacements for the same 60 tracks synthesized using the wind-field method (shown in black) and the 6-hour zonal displacement statistics derived from only post-1970 HURDAT data (shown in gray). FIG. 10 illustrates a better match, indicating that the earlier HURDAT data may in fact be slightly inaccurate.

As discussed above, once a track is generated by either method, the evolution of event intensity along the track may be estimated. According to one embodiment, this may be done using a Markov chain process, making each increment of intensity conditional on event position, previous intensities, etc. as determined from observed (historical or simulated) event data. However, this method may not be preferable in regions where there is a scarcity of event data.

According to another embodiment, a deterministic simulation of event intensity may be run along each track to estimate probability distributions of event intensity. Again, it is to be appreciated that although this discussion focuses on hurricanes, this technique can be used to estimate intensity for many different events and is not limited to hurricanes. In one embodiment, a deterministic numerical simulation of hurricane intensity may be run along each synthetic track using, for example, the model developed by Emanuel et al., which is herein incorporated by reference (Emanuel, K., C. DesAutels, C. Holloway and R. Korty, 2004: Environmental control of tropical cyclone intensity. *J. Atmos. Sci.*, 61, 843-858). This is an axisymmetric balance model coupled to a one-dimensional ocean model. The atmospheric component accounts for gradient and hydrostatic balance. The interior structure of the storm is constrained by an assumption of moist adiabatic lapse rates on angular momentum surfaces. Entropy may be defined in the planetary boundary layer (PBL) and at a single level in the middle troposphere. Convention may be based on an assumption of boundary layer quasi-equilibrium, and surface fluxes may be modeled by conventional aerodynamic formulae. In one embodiment, the model may be phrased in angular momentum coordinates which may yield exceptionally high resolution (for example, on the order of 1 km) in the critical eyewall region of the storm. The ocean component of the model may account for ocean mixing by bulk-Richardson number closure (which defines the ease with which the ocean can mix), and the mixed-layer ocean currents may be driven by the hurricane model surface wind.

Inputs to the deterministic coupled intensity model may include the synthetic track (e.g., position and time) data, as well as estimates of potential intensity, upper ocean thermal structure, monthly climatological ocean mixed layer depths, and environmental wind shear along the track. In one example, bathymetry and topography may also be included. Landfall may be represented by reducing the surface enthalpy exchange coefficient, depending on the elevation of the land. In one example, the enthalpy exchange coefficient decreases linearly with land elevation, reaching zero when land elevation is about 40 meters, which accounts, at least in part, for heat fluxes from low-lying, swampy or marshy terrain. In one example, monthly mean climatological potential intensity may be calculated from a data set, such as, for example, the NCEP reanalysis data, linearly interpolated to the storm position in time and space (taken from the track data). Potential intensity is defined as the maximum wind speed (or intensity) theoretically attainable in tropical cyclones given large-scale thermodynamic conditions (e.g., water temperature, atmospheric temperature etc.). In one example, upper ocean thermal variability may also be accounted for in the intensity model by using sea surface altimetry data to quantify the climatological variability of the upper ocean. It is to be appreciated that inputs to the model may depend on the model being used and are not limited to these examples. Furthermore, models other than that developed by Emanuel et al. may also be used, particularly if events other than hurricanes are being evaluated.

Given a storm track, the model may be integrated forward in time to yield a prediction of wind speed along the track. The storm may be initialized at the genesis location of the track by specifying a synthetic warm core vortex at the beginning of the track. Initial intensity and rate of intensification values may be set. Initial intensity values may be derived from statistical information about storm formation, from actual storms, or may be randomly chosen. It may be preferable to select initial values in line with known data about events. In one example for hurricane intensity modeling, an initial intensity of 15 ms$^{-1}$ and an initial intensification rate of about 6 ms$^{-1}$ day$^{-1}$ may be used although it is to be appreciated that other values may be selected. Radial eddy flux of entropy at middle levels may be specified so as to achieve a specified initial rate of intensification. This matching procedure may effectively initialize middle tropospheric humidity as well as balanced flow.

Because this model is axisymmetric, it does not account for the effect of environmental wind shear, which can therefore be represented parametrically. For example, this may be accomplished by advecting low entropy air at middle levels into the core in proportion to a function of the environmental wind shear. As discussed above, estimates of wind shear can be calculated from the synthetic time series of winds at, for example, 250 hPa and 850 hPa, and used in the intensity model. Where tracks are generated using the Markov chain method described above, these wind shear estimates will be independent of track displacements (though will vary with position along the track and with season due to the corresponding variations in the underlying observed statistics used to generate the tracks), but where tracks are generated using the same wind fields (as discussed above), track displacements and wind shear will be mutually consistent. Furthermore, if and when storm intensity falls below a predetermined limit, for example, 13 ms$^{-1}$, it may be assumed that the storm has dissipated and the integration may be halted, thereby forcing termination of the associated track. The initial rate of intensification may be based on climatology and, in one example, may be independent of the wind field taken at the beginning of the associated synthetic time series (whose generation is described above). Although this independence may allow storms to be generated under conditions of large wind shear, which may be unrealistic, the intensity model may quickly terminate storms under such conditions, and it is therefore not of great concern. However, in one example, integration time may be saved by regenerating the random wind series whenever the vertical shear at the genesis point exceeds a predetermined value under which it is unlike that a storm could generate. For example, such a value for wind shear may be about 12 ms$^{-1}$.

Referring to FIG. 15, there is illustrated a comparison of the above-described model (i.e., an axisymmetric balance (atmospheric) model coupled to a one-dimensional ocean model) compared to the same atmospheric model coupled to a three-dimensional ocean model. As can be seen from FIG. 15, there is a very close correlation in wind speeds estimated by this model (line 140) and by a coupled three-dimensional model (line 142), indicating that this model may fairly accurately represent the characteristics of hurricanes and that a multi-dimensional model may not be necessary to produce good wind speed estimates. This may be advantageous in that a one-dimensional model may be run along each track far more quickly than may a three-dimensional model.

To estimate wind speeds at fixed points in space, it may be necessary to estimate the radial structure of the storm's wind field. In one example, the intensity model itself may be able to predict this structure. In another embodiment, a parametric wind profile may be fitted to estimates of maximum wind speed and maximum wind radius that may be generated by the intensity model. One example of an axisymmetric wind field that may be calculated using one such parametric form may be written:

$$V^2 = V_m^2 \left(\frac{r_0 - r}{r_0 - r_m}\right)^2 \left(\frac{r}{r_m}\right)^{2m} \left[\frac{(1-b)(n+m)}{n + m\left(\frac{r}{r_m}\right)^{2(n+m)}} + \frac{b(1+2m)}{1 + 2m\left(\frac{r}{r_m}\right)^{2m+1}}\right] \quad (15)$$

where $V_m$ is the maximum wind speed, r is the radius, $r_m$ is the radius of maximum winds, $r_0$ is an outer radius at which winds vanish, and b, m and n are parameters governing the shape of the wind profile. In one example, the outer radius may be estimated to be approximately 1200 kilometers, although other values may also be selected. A liberal estimate of this radius may only affect the outer structure of the vortex, and thus may only affect probability assessments at low wind speeds, which are of lesser concern since they typically do less damage. The parametric values b, m and n may be selected based on known wind storm characteristics. In one example, the values b=0.25, m=1.6 and n=0.9 were used, however, other values may be chosen depending on the type and location of the wind storm being modeled. The values of $V_m$ and $r_m$ may be supplied by the intensity model.

Thus, an estimate of the wind speed distribution at fixed points in space away from the storm center may be obtained from the equation (15). In one embodiment, a fraction of the storm's translation velocity in the direction of the storm's motion may be added to the axisymmetric wind field defined by equation (15) to estimate the wind speed distribution for each storm/track. In one example, using the above parametric values, it has been found that adding approximately 60% of the translation speed results in good agreement with historical data. According to one embodiment, the maximum wind speed experienced at a point of interest as well as the maximum wind speed experienced within a fixed distance from the point of interest may be calculated. By summing these values over the total number of tracks passing within range of the point of interest, annual wind exceedence probabilities and return periods may be estimated, and these can be compared to estimates based directly on historical data such as HURDAT.

It is possible that several hurricane tracks generated according to either track generation method may undergo extratropical transitions and pass through higher latitude regions. However, in one embodiment, dynamic interactions with extratropical systems may be specifically excluded. Were such interactions linear, and were both the tropical cyclone and the extratropical system with which it interacts quasi-geostrophic, then the wind fields of all the systems could be linearly superimposed and the extratropical interaction would be accounted for by having added the translation speed to the wind speed, as described above. However, extratropical transition may be strongly non-linear and it is possible that the circulation around the tropical cyclone may, in some circumstances, enhance the amplitude of encountered extratropical vorticity anomalies. Therefore, the above-described intensity modeling may not account for these effects, which may impact results obtained for high-latitude regions, as discussed further below.

In summary, to generate hurricane risk assessments, one or both of the above-described track generation methods may be used to generate a large number (e.g., many thousands) of synthetic tracks. A filter may be applied to the track generator(s) to select tracks that pass with a specified distance of a point or region of interest. A hurricane intensity model, such as the above-described model, may then be run along each of the selected tracks to produce a histogram of maximum wind speed. In one example, an intensity model such as that described above may take, on average, approximately 15 seconds to run a single track on a typical workstation computer, and it may thus be feasible to run the model over many thousands of tracks that pass near a location of interest. The higher the number of synthetic tracks used, the better the resulting probability distributions of wind speed may be. According to one embodiment, a deterministic coupled intensity model produces maximum wind speed and a radius of maximum winds, as described above. An idealized parametric wind profile may be fitted to the numeric output of the intensity model to produce an axisymmetric wind field such as that described by equation (15). This wind field may be used to estimate maximum winds at fixed points in space away from the storm center, as described above. For this purpose, a fraction of the linear translation speed vector may be added to the circular vortex wind field to account for some of the observed asymmetry in overall storm wind patterns. For each point or region of interest, the intensity model may be run over many thousands of tracks to produce wind exceedence probabilities for that point or region.

Embodiments of the methods described herein may be encoded in software, for example, as a set of instructions that may be run on one or more processors or computers, to generate tracks and model event intensity along the tracks. Resulting data may be provided as a data set of event intensity probabilities for a region or location of interest.

To demonstrate working examples of the above described techniques, there are presented three sets of synthetic hurricanes. The first is a random selection of 1000 storms affecting the North Atlantic as a whole, and the other two are for cities having very different hurricane climatologies, namely Boston and Miami. Miami has a relatively rich record of storms, most of which probably have not undergone significant interactions with extratropical systems, whereas Boston has a sparse record of storms, most of which probably have been affected by extratropical systems.

Figure 11:
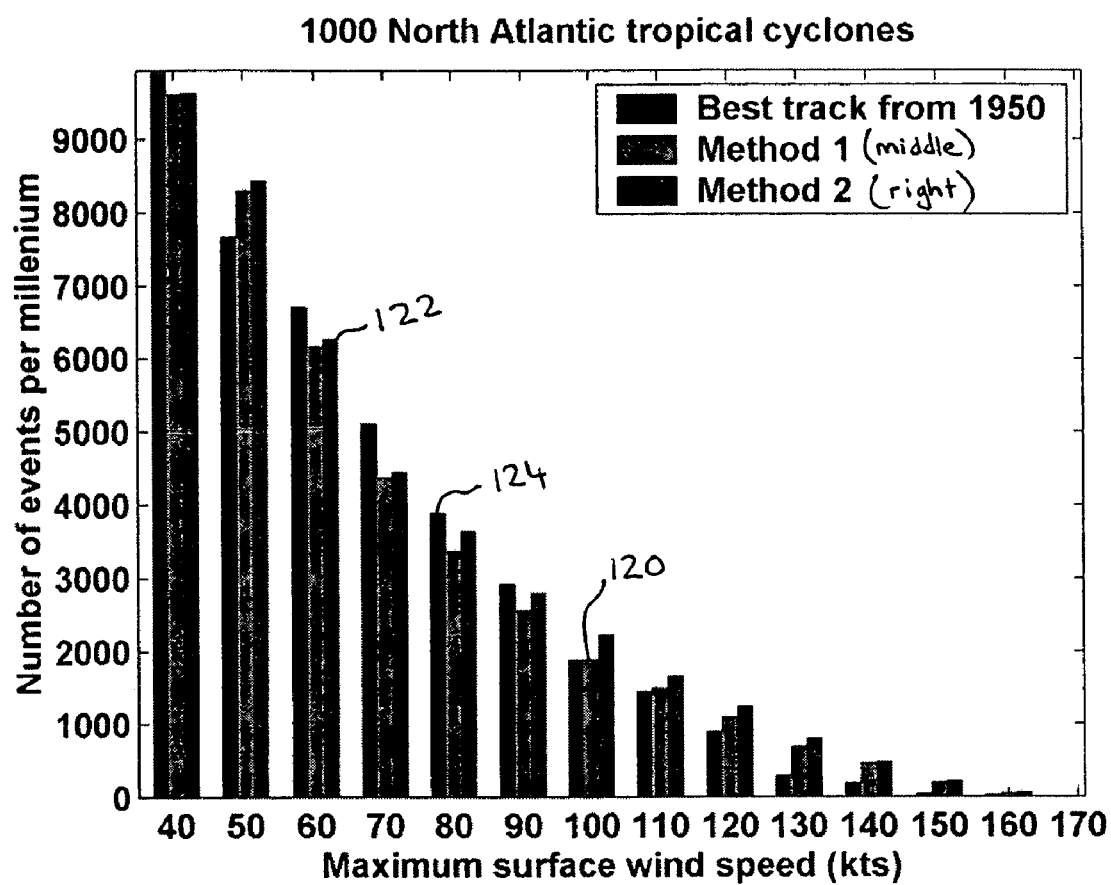
FIG. 11 is an illustration of normalized histograms of maximum wind speeds achieved in 1000 North Atlantic storms created using each of the two track generation methods according to embodiments of the invention and data from storms in the HURDAT record beginning in 1950.

Referring to FIG. 11, there is illustrated a normalized histogram of maximum wind speeds achieved in 1000 North Atlantic storms created using each of the two track generation methods described herein with a normalized histogram from all storms in the HURDAT record beginning in 1950. The histogram derived from tracks generated using the Markov chain method is designated by reference numeral 120; the histogram derived from tracks generated using the wind-field method is designated by reference numeral 122, and the histogram derived from HURDAT tracks data is designated by reference numeral 124. The ordinate shows the number of events whose wind speeds exceed the value given on the abscissa. Each histogram is normalized to events per millennium. As can be seen from the figure, both track generation methods may slightly overestimate the number of intense storms. However, it should be noted that the observed statistics are based on very few actual recorded storms which may skew the data. The histograms follow a bilinear cumulative frequency distribution, and it should be noted that such distributions are bounded so that, in general, there is a maximum theoretical wind speed that can be experienced in any given place. In the Tropics, this maximum may correspond closely to the potential intensity. However, at higher latitudes, storm translation speed may allow some maximum wind values to exceed the local potential intensity, which may account in part for the effect of extratropical transition. The close correspondence of the intensity statistics indicate that the methods described herein are a viable approach to assessing hurricane wind risk.

Figure 12:
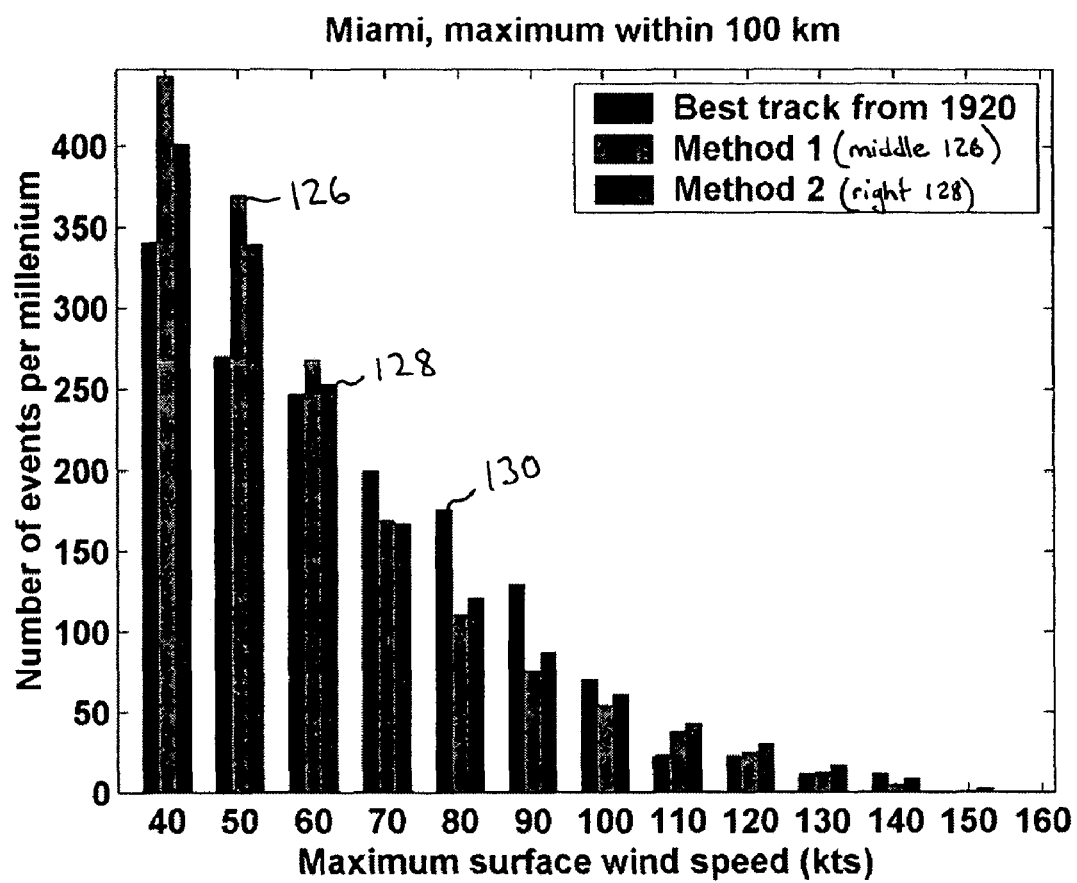
FIG. 12 is an illustration of histograms of frequency of exceedence of wind speed within 100 km of downtown Miami.

Miami, Fla. is an example of a city having a relatively high incidence of hurricanes. To produce annual exceedence probabilities for wind speed in the area, both of the above-described track generation techniques were used to synthesize 3,000 tracks each, passing within 100 km of downtown Miami. The intensity model was then run on each track, as described above, to accumulate wind statistics for the Miami area. (It should be remembered that not all storms on the synthetic tracks reach Miami before their wind speeds fall below 13 ms$^{-1}$ and are thus terminated). Referring to FIG. 12, there is illustrated histograms of frequency of exceedence of wind speeds anywhere within 100 km of downtown Miami. The histogram derived from tracks generated using an embodiment of the Markov chain method is designated by reference numeral 126 and the histogram derived from tracks generated using an embodiment of the synthetic wind time series method is designated by reference numeral 128. FIG. 12 compares these histograms with a histogram of the same statistic derived from HURDAT track data, which is designated by reference numeral 130. Each histogram is normalized to events per millennium.

It should be appreciated that the HURDAT database contains records of only 29 tracks with maximum winds in excess of 40 knots passing within 100 km of Miami during the time period in question, whereas each of the synthetic track generation techniques produced 3000 tracks in this exercise. In addition, the HURDAT data may be biased due to changing conventions in converting between central surface pressure and wind speed. Given these potential biases and small sample size, it is likely that the present results indicated by histograms 126 and 128 are consistent with the HURDAT data within the statistical significance of the HURDAT-derived histogram 130.

As discussed above, certain locations, such as Boston, Mass., experience very infrequent, but sometimes devastating storms. In these locations, the historical record may be greatly insufficient to make reasonable risk assessments there from, yet there are still strong incentives to estimate risk. In such locations, the infrequency of storms may affect the robustness of the statistics used in the Markov chain track generator. This is not a problem for the synthetic wind time series track generator. However, at high latitudes, the assumption that tropical cyclones move with a weighted mean vertical flow plus a constant correction may be less accurate, particularly due to extratropical transition effects. Thus, for a location such as Boston, it may be preferable to use a combination of the two track generation techniques to best assess wind risk.

Figure 13:
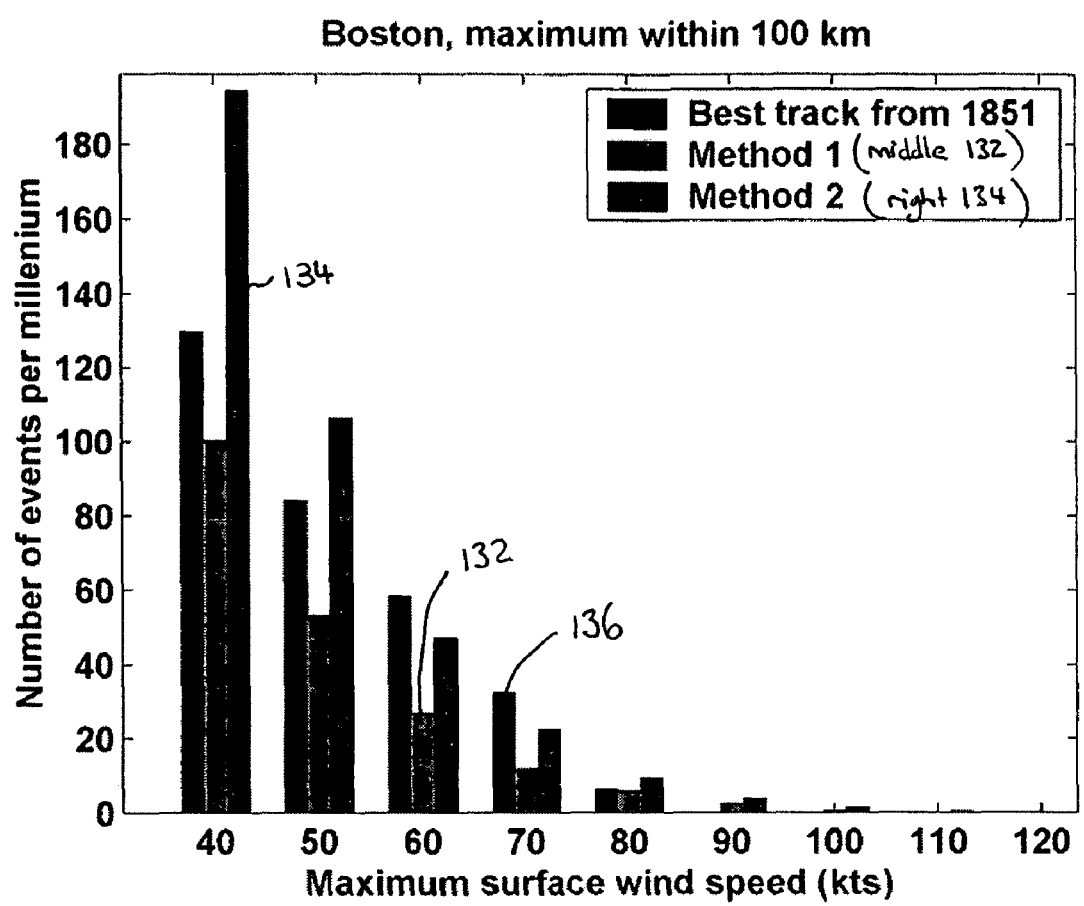
FIG. 13 illustrates histograms of frequency of exceedence of wind speed within 100 km of downtown Boston.

Referring to FIG. 13, there are illustrated histograms of maximum wind speed within 100 km of downtown Boston, from both track generation techniques as well as historical data. The histogram from tracks generated using the Markov chain method is designated by reference numeral 132 and the histogram from tracks generated using the synthetic wind time series method is designated by reference numeral 134. The histograms from both methods are compared to one another and to a histogram of the same statistic derived from HURDAT track data in FIG. 13. It should be appreciated that the HURDAT histogram, designated by reference numeral 136 is based on only 27 events and is thus subject to substantial statistical error. As can be seen from FIG. 13, there are fairly large differences between the histograms, with a substantially larger number of low intensity events predicted by the synthetic wind time series track generator. This may be owing to artificially large survival rates of weak storms generated using the synthetic wind time series method.

Figure 14:
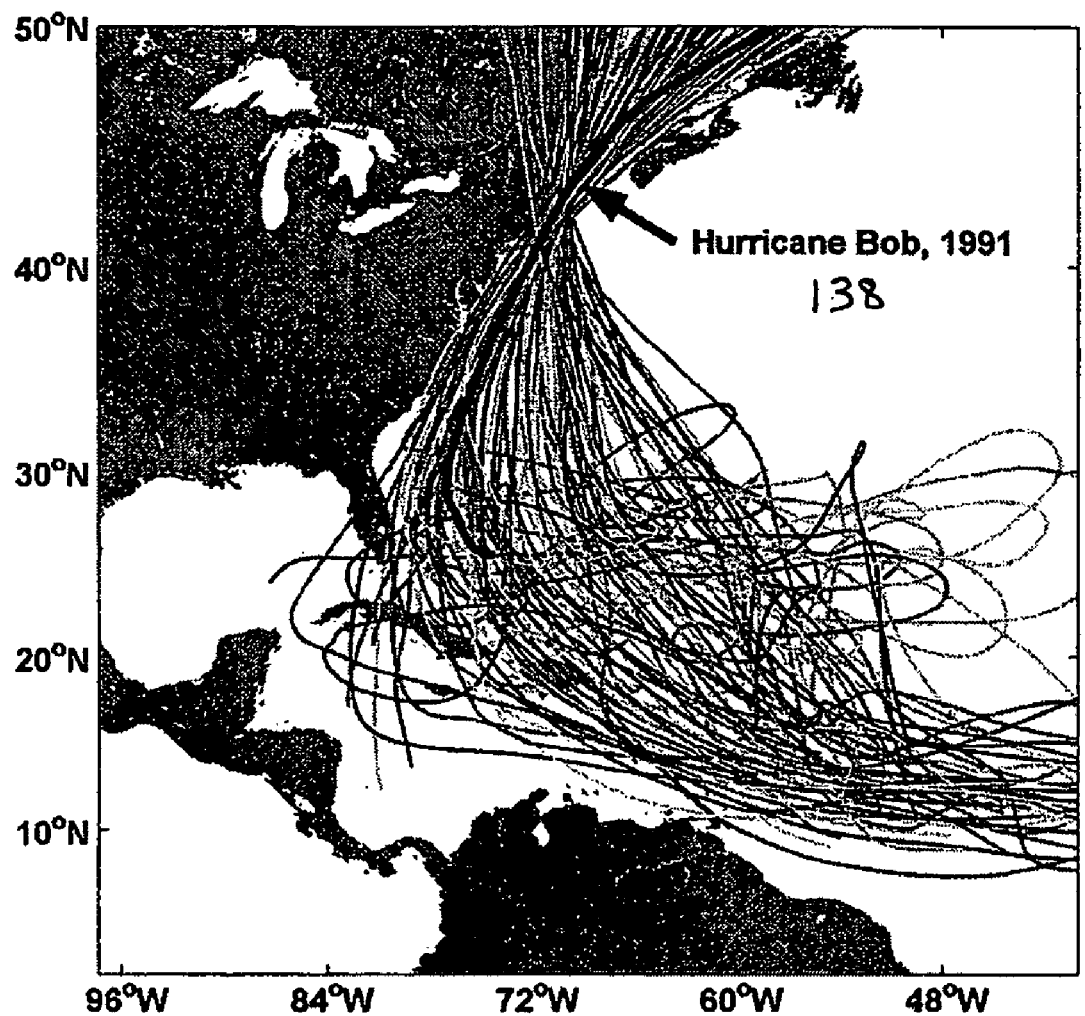
FIG. 14 is a representation of synthetic hurricane tracks affecting Boston, generated according to embodiments of the invention and compared with a recorded hurricane track.

Referring to FIG. 14, there is illustrated a representation of the 100 most intense of the 3000 synthetic storms affecting Boston, generated using the synthetic wind time series method of track generation. Shown for comparison (indicated by line 138) is the observed track of Hurricane Bob of 1991. Hurricane Bob was the most recent storm to produce hurricane force winds near Boston. As can be seen from FIG. 14, its track falls well within the envelope of the 100 most intense storms generated using the synthetic wind time series method. This indicates that this method may produce meaningful probabilities of hurricane wind risk, even in areas like Boston that have a very sparse historical record and where the local potential intensity is zero.

In summary, aspects and embodiments of the invention are directed to a novel approach to hurricane wind risk assessment in which a coupled ocean-atmosphere hurricane model may be run along each of a large number of synthetic hurricane tracks. To synthesize the hurricane tracks one or both of two independent track generation methods may be used. The first method constructs each track as a Markov chain whose probability of vector displacement change depends on position, season, and the previous time-step vector displacement, with statistics determined by standard distribution functions fitted to observed track data. The second method assumes that hurricanes move with a weighted average of upper and lower tropospheric flow plus a beta drift correction which accounts for the effect of coriolis force. The flow may be generated using synthetic time series of wind whose monthly mean, variance and covariance conform to statistics derived from historical or simulated data, and whose kinetic energy obeys the observed $\omega^{-3}$ frequency distribution characteristic of geostrophic turbulence. Shear derived from these synthetic flows may be used as an input to the deterministic intensity model in both track generation methods. The statistics of storm motion produced by both methods conform well to observed displacement statistics and to each other.

To the extent that there exist reliable characterizations of the interannual to interdecadel variation of atmospheric winds, for example, owing to effects such as El Nino or the Atlantic Multidecadel Oscillation, and tropical cyclogenesis distributions, or a prediction of how they might change in a future climate, the methods of the invention (particularly, the synthetic wind time series track generation method) can be used to estimate the corresponding changes in hurricane wind risk. For example, statistical data can be derived from simulations and models that predict future climate changes, such as global warming, and this data can be used in the track generators and intensity model rather than, or in addition to, historical data. This can allow predictions of future changes in, for example, frequency of events, changes in intensity, changes in storm duration, and changes in tracks.

Having thus described several aspects and embodiments of the invention, modifications and/or improvements may be apparent to those skilled in the art and are intended to be part of this disclosure. It is to be appreciated that the invention is not limited to the specific examples described herein and that the principles of the invention may be applied to a wide variety of risk assessment applications for many different types of events beyond hurricanes. The above description is therefore by way of example only, and includes any modifications and improvements that may be apparent to one of skill in the art. The scope of the invention should be determined from proper construction of the appended claims and their equivalents.

What is claimed is:

1. A method of predicting storm wind distributions within a specified region of interest using a computer processor, the method comprising:
   synthesizing a time series of environmental wind corresponding to multiple atmospheric levels constrained by climate data;
   statistically synthesizing a plurality of storm tracks that pass within a specified region;
   for each storm track of the plurality of synthesized tracks
   (a) determining environmental wind along the storm track from the synthesized time series of environmental wind,
   (b) determining, using the computer processor, storm intensity along the storm track by applying a deterministically simulation using environmental data as an input, the environmental data including the determined environmental wind along the storm track, and
   (c) determining an output representative of storm wind along the storm track from the determined storm intensity along the track; and
   using the determined outputs representative of the storm winds to estimate an overall storm wind probability distribution from a combination of the storm wind along the synthesized tracks that passes within the specified region.

2. The method of claim 1, wherein synthesizing the plurality of storm tracks includes:
   originating the plurality of storm tracks by randomly selecting a corresponding plurality of genesis points from a space-time probability density function of genesis locations based on at least one of historical wind storm data and simulated climate data.

3. The method of claim 2, wherein the step of originating includes:
   constructing a space-time grid over an area of interest; and
   counting a number of wind storms originating within each cell of the space-time grid based on at least one of the historical wind storm data and the simulated climate data to provide estimated distribution of genesis points for the large plurality of wind storm tracks within the area of interest.

4. The method of claim 3, wherein the step of originating further includes smoothing the estimated distribution of genesis points using a spatially decaying window function to create the space-time probability density function of genesis locations.

5. The method of claim 4, wherein the spatially decaying window function includes a three-dimensional Gaussian kernel.

6. The method of claim 1, wherein statistically synthesizing the plurality of storm tracks further includes:
   generating each of the plurality of storm tracks using a Markov chain constructed with statistical features of historical or simulated storm tracks.

7. The method of claim 6, wherein state variables of the Markov chain include speed and direction of the plurality of storm tracks.

8. The method of claim 6, wherein the state variables of the Markov chain include zonal and meridianal components of the plurality of storm tracks.

9. The method of claim 1, wherein statistically synthesizing the plurality of wind storm tracks includes:
modeling storm motion as a weighted average of environmental wind at least two pressure levels plus a beta drift correction.

10. The method of claim 9, wherein the at least two pressure levels include a 250 hPa pressure level and an 850 hPa pressure level.

11. The method of claim 9, wherein synthesizing the time series includes modeled the time series of wind as a Fourier series with randomly varying phase, with means and variances constrained by one of observed and modeled climate data, and with a preset kinetic energy spectrum.

12. The method of claim 1, wherein in statistically synthesizing the plurality of storm tracks, each storm track has characteristics that conform to statistics derived from at least one of historical wind storm data and simulated wind storm data.

13. The method of claim 1, wherein determining storm intensity along the storm track by applying the deterministic simulation includes:
modeling the storm intensity using a model phrased in angular momentum coordinates and using environmental thermodynamic parameters and wind shear.

14. A computer readable medium encoded with a plurality for instructions adapted to be executed on at least one processor to:
synthesize a time series of environmental wind corresponding to multiple atmospheric levels constrained by climate data;
statistically synthesize a plurality of storm tracks that pass within a specified region;
for each storm track of the plurality of synthesized tracks
(a) determine environmental wind along the storm track from the synthesized time series of environmental wind,
(b) determine storm intensity along the storm track by applying a deterministic simulation using environmental data as an input, the environmental data including the determined environmental wind along the storm track, and
(c) determining an output representative of storm wind along the storm track; and
use the determined outputs representative of the storm winds to estimate an overall storm wind probability distribution from a combination of the storm wind along the synthesized tracks that passes within the specified region.

15. A data set comprising a probabilistic wind speed distribution within the specified region, the data set being generated according to the method of claim 1.

16. A method of generating a data set corresponding to a probabilistic wind speed distribution within a specified region using a computer processor, the method comprising:
synthesizing a time series of environmental wind corresponding to multiple atmospheric levels constrained by climate data;
statistically synthesizing a plurality of storm tracks that pass within the specified region;
for each storm track of the plurality of synthesized tracks
(a) determining environmental wind along the storm track from the synthesized time series of environmental wind,
(b) determining, using the computer processor, storm intensity along the storm track by applying a deterministic simulation using environmental data as an input, the environmental data including the determined environmental wind along the storm track, and
(c) determining an output representative of storm wind along the storm track from the determined storm intensity along the track; and
producing the data set by combining the outputs representative of storm wind for the synthesized storm tracks that pass within the specified region.

17. A method of estimating long-term risk associated with wind speed within an area of interest using a computer processor, the method comprising:
synthesizing a time series of environmental wind corresponding to multiple atmospheric levels constrained by climate data;
statistically synthesizing a plurality of storm tracks that pass within the area of interest;
for each storm track of the plurality of synthesized tracks
(a) determining environmental wind along the storm track from the synthesized time series of environmental wind,
(b) determining, using the computer processor, storm intensity along the storm track by applying a deterministic simulation using environmental data as an input, the environmental data including the determined environmental wind along the storm track, and
(c) determining an output representative of total wind from parametric or modeled storm wind and an environmental wind along the storm track using the determined storm intensity along the track;
generating a probabilistically weighted combination of the total wind along each track to create a probabilistic total wind distribution within the area of interest; and
estimating a risk of wind speed within the area of interest exceeding a predetermined threshold value based on the probabilistic total wind distribution.

18. The method of claim 1 wherein the specified region comprises a region within a predetermined distance from a point of interest.

* * * * *